US008599171B2

(12) United States Patent
Onishi

(10) Patent No.: US 8,599,171 B2
(45) Date of Patent: Dec. 3, 2013

(54) OPTICAL POSITION DETECTING DEVICE AND DISPLAY DEVICE WITH POSITION DETECTING FUNCTION

(75) Inventor: Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 578 days.

(21) Appl. No.: 12/882,562

(22) Filed: Sep. 15, 2010

(65) Prior Publication Data

US 2011/0096030 A1    Apr. 28, 2011

(30) Foreign Application Priority Data

Oct. 26, 2009 (JP) ................................. 2009-245192

(51) Int. Cl.
  *G06F 3/042* (2006.01)
  *G06F 3/038* (2013.01)
(52) U.S. Cl.
  USPC .......................................... 345/175; 345/204
(58) Field of Classification Search
  USPC .................. 345/175, 156, 161, 204, 207, 178
  See application file for complete search history.

(56) References Cited

U.S. PATENT DOCUMENTS

2009/0015836 A1 * 1/2009 Maeda ........................ 356/400
2009/0244513 A1 * 10/2009 Matsumoto et al. ............ 355/77

FOREIGN PATENT DOCUMENTS

| JP | 2001290603 A | 10/2001 |
| JP | 2004-295644 | 10/2004 |
| JP | 2004-303172 | 10/2004 |
| WO | WO 2008/138049 | * 11/2008 |
| WO | WO-2008138049 A1 | 11/2008 |

* cited by examiner

*Primary Examiner* — Michael Faragalla
(74) *Attorney, Agent, or Firm* — Harness, Dickey & Pierce, P.L.C.

(57) ABSTRACT

An optical position detecting apparatus for optically detecting a position of a target object in a detection region includes: a light source device for position detection that emits position detection light to the detection region and forms an intensity distribution of the position detection light in the detection region; a photodetector that receives the position detection light reflected on the target object; and a position detecting device that detects the position of the target object on the basis of a light reception result in the photodetector, wherein the light source device for position detection includes: a linear light source unit extending along an outer peripheral edge of the detection region and including a light emitting section that emits the position detection light to the detection region; and a light-source driving unit that drives the linear light source unit.

7 Claims, 14 Drawing Sheets

OPTICAL POSITION DETECTING DEVICE AND DISPLAY DEVICE WITH POSITION DETECTING FUNCTION

BACKGROUND

1. Technical Field

The present invention relates to an optical position detecting apparatus and a display device with position detecting function including the optical position detecting apparatus.

2. Related Art

In recent years, in electronic apparatuses such as a cellular phone, a car navigation system, a personal computer, a ticket machine, and a bank terminal, a display device with position detecting function in which a touch panel is arranged on a front surface of an image generating device such as a liquid crystal device is used. In such a display device with position detecting function, a user inputs information while referring to an image displayed on the image generating device. Such a touch panel is configured as a position detecting device for detecting the position of a target object in a detection region.

As a detection system employed in such a position detecting device, a resistance film system, an ultrasonic system, a capacitance system, an optical system, and the like are known. The resistance film system is low in cost. However, the resistance film system as well as the capacitance system is low in transmittance. The ultrasonic system and the capacitance system have high response speed but are low in environmental resistance. On the other hand, the optical system has a characteristic that the environmental resistance, the transmittance, and the response speed can be respectively set high (see JP-A-2004-295644 and JP-A-2004-303172).

However, in optical position detecting apparatus described in JP-A-2004-295644 and JP-A-2004-303172, cost is high because light sources, photodetectors, and the like in a number corresponding to resolution at a position coordinate to be detected are necessary near a display screen.

Therefore, the inventor has been examining an optical position detecting apparatus including light sources for position detection 1012 provided at corner portions of a light guide plate 1060 as schematically shown in FIG. 15. In such an optical position detecting apparatus, the light sources for position detection 1012 are sequentially turned on, position detection light L2 emitted from the light guide plate 1060 is reflected on a target object Ob such as a finger, and reflected light of the position detection light L2 is detected by a photodetector 1030. In that case, since a predetermined relation holds between the intensity of the position detection light L2 emitted from the light guide plate 1060 and a distance from the light sources for position detection 1012, the position of the target object Ob such as the finger can be detected. Therefore, there is an advantage that only small numbers of light sources for position detection 1012 and photodetectors 1030 are necessary.

However, in the optical position detecting apparatus of such a system, regardless of the fact that the position detection light L2 emitted from the light sources for position detection 1012 propagate in every direction in the light guide plate 1060 while diverging, an intensity distribution in the two-dimensional directions of the position detection light L2 in a detection region 10R is controlled according to only a propagation distance of the position detection light L2. Therefore, since it is relatively difficult to form a proper intensity distribution, the position of the target object Ob cannot be accurately detected. A configuration shown in FIG. 15 is a reference example for the invention and is not a related art.

SUMMARY

An advantage of some aspects of the invention is to provide an optical position detecting apparatus that can properly form an intensity distribution of position detection light in a detection region and a display device with position detecting function including such an optical position detecting apparatus.

According to an aspect of the invention, there is provided an optical position detecting apparatus for optically detecting the position of a target object in a detection region. The optical position detecting apparatus includes: a light source device for position detection that emits position detection light to the detection region and forms an intensity distribution of the position detection light in the detection region; a photodetector that receives the position detection light reflected on the target object; and a position detecting device that detects the position of the target object on the basis of a light reception result in the photodetector. The light source device for position detection includes: a linear light source unit extending along an outer peripheral edge of the detection region and including a light emitting section that emits the position detection light to the detection region; and a light-source driving unit that drives the linear light source unit.

In the aspect of the invention, the position detection light is emitted from the linear light source unit to the detection region and, when the position detection light is reflected by the target object, reflected light of the position detection light is detected by the photodetector. Since the intensity of the position detection light in the detection region and a distance from the light source for position detection have a predetermined correlation, the position of the target object can be detected from the light reception result obtained via the photodetector. Accordingly, since it is unnecessary to arrange a large number of optical elements along the detection region, it is possible to configure a position detecting device that is manufactured at low cost and consumes low power. In the aspect, the linear light source unit is used. In such a linear light source unit, it is easy to control the emission intensity of the position detection light in an extending direction of the linear light source unit. The intensity of the position detection light in an emitting direction from the linear light source unit is surely specified by the distance from the linear light source unit. Therefore, it is possible to surely form a proper intensity distribution of the position detection light in the detection region. Therefore, it is possible to detect the position of the target object at high accuracy.

In the aspect of the invention, the linear light source unit may include: a first light guide member extending along the outer peripheral edge of the detection region; a first light emitting element that emits the position detection light to a light incident section provided at one end in an extending direction of the first light guide member; a second light guide member extending along the outer peripheral edge of the detection region; and a second light emitting element that emits the position detection light to a light incident section provided at one end in an extending direction of the second light guide member. Each of the first light guide member and the second light guide member may include: the light emitting section; and an inclined reflection surface formed obliquely to the light emitting section on a surface side opposed to the light emitting section. The first light guide member and the second light guide member are arranged to face to directions opposite to each other in an extending direction of the linear light source unit and in parallel in a direction orthogonal to the extending direction. With such a configuration, since the linear light source unit can be configured by the light guide members and the light emitting elements, it is possible to inexpensively configure the linear light source unit. Among intensity distributions of the position detection light emitted from the light guide members to the detection region, an intensity distribution in the extending direction of the linear light source unit can be surely controlled by the light guide members. An intensity distribution in the direction orthogonal to the extending direction of the linear light source unit is surely specified by a distance from the light guide members. Therefore, since it is possible to surely control an intensity distribution of the position detection light emitted from the linear light source unit, it is possible to accurately detect the position of the target object. In the linear light source unit, the light guide members are arranged to face to the directions opposite to each other in the extending direction of the linear light source unit and in parallel in the direction orthogonal to the extending direction. Therefore, when the first light emitting element is turned on, when the second light emitting element is turned on, and when the first light emitting element and the second light emitting element are turned on, it is possible to respectively realize a first mode in which an emitted light amount decreases from one side to the other side of the extending direction of the linear light source unit, a second mode in which an emitted light amount decreases from the other side to one side of the extending direction of the linear light source unit, and a third mode in which an emitted light amount is equal from one side to the other side of the extending direction of the linear light source unit. Accordingly, it is possible to form three kinds of intensity distributions and use the respective intensity distributions for detection of the position of the target object.

In the aspect of the invention, the linear light source unit may include: a light guide member extending along an outer peripheral edge of the detection region; and plural light emitting elements that emit the position detection light to the light guide member. The light guide member may include: the light emitting section; and prism-like projections provided in plural places in an extending direction of the linear light source unit on a surface side opposed to the light emitting section. The prism-like projections may include: first sides that form inclined reflection surfaces oblique to the light emitting section; and second sides that form light incident sections oblique to the inclined reflection surfaces. The light emitting elements may be provided toward the light incident sections of the prism-like projections. With such a configuration, since the linear light source unit can be configured by the light guide member and the light emitting elements, it is possible to inexpensively configure the linear light source unit. Among intensity distributions of the position detection light emitted from the light guide member to the detection region, an intensity distribution in the extending direction of the linear light source unit can be surely controlled by the light guide member and the light emitting elements. An intensity distribution in a direction orthogonal to the extending direction of the linear light source unit is surely specified by a distance from the light guide member. Therefore, since it is possible to surely control an intensity distribution of the position detection light emitted from the linear light source unit, it is possible to accurately detect the position of the target object. Since the linear light source unit includes the plural light emitting elements in the extending direction, it is possible to realize, by changing a balance of light emission amounts of the plural light emission elements, a first mode in which an emitted light amount decreases from one side to the other side of the extending direction of the linear light source unit, a second mode in which an emitted light amount decreases from the other side to one side of the extending direction of the linear light source unit, and a third mode in which an emitted light amount is equal from one side to the other side of the extending direction of the linear light source unit. Accordingly, it is possible to form three kinds of intensity distributions and use the respective intensity distributions for detection of the position of the target object.

In the aspect of the invention, the linear light source unit may be provided as a first linear light source unit and a second linear light source unit extending along an outer peripheral edge of the detection region on both sides across the detection region. The first linear light source unit and the second linear light source unit may be switched by the light-source driving unit to a first mode in which an emitted light amount decreases from one side to the other side of the extending direction of the linear light source unit, a second mode in which an emitted light amount decreases from the other side to one side of the extending direction of the linear light source unit, and a third mode in which an emitted light amount is equal from one side to the other side of the extending direction of the linear light source unit. With such a configuration, it is possible to form, at different timings, an intensity distribution for first coordinate detection in which intensity changes in a first direction and an intensity distribution for second coordinate detection in which intensity changes in a second direction crossing the first direction. As the intensity distribution for first coordinate detection, it is possible to form, at different timings, a first intensity distribution for first coordinate detection in which the intensity of the position detection light falls from one side to the other side of the first direction and a second distribution for first coordinate detection in which the intensity of the position detection light falls from the other side to one side of the first direction. Further, as the intensity distribution for second coordinate detection, it is possible to form, at different timings, a first intensity distribution for second coordinate detection in which the intensity of the position detection light falls from one side to the other side of the second direction and a second intensity distribution for second coordinate detection in which the intensity of the position detection light falls from the other side to one side of the second direction. Therefore, it is possible to detect two-dimensional coordinates of the target object at high accuracy.

In the aspect of the invention, in front of the light emitting section, at least one of a first light blocking section and a second light blocking section may be provided. The first light blocking section limits emission of the position detection light in a direction orthogonal to both a direction to which the light emitting section faces and an extending direction of the linear light source unit and the second light blocking section limits emission of the position detection light in a direction obliquely tilting to the extending direction from a direction to which the light emitting section faces in plural places in the extending direction. With such a configuration, it is possible to narrow a divergence angle of the position detection light emitted from the light emitting section to the detection region and emit the position detection light from the light emitting section to the detection region as substantially parallel rays. Therefore, since it is possible to properly form an intensity distribution of the position detection light in the detection region, it is possible to accurately detect the position of the target object.

In the aspect of the invention, the first light blocking section and the second light blocking section may be formed in a common emitting-direction limiting member. With such a configuration, simply by arranging the emitting-direction limiting member on the front side of the linear light source unit, it is possible to properly form an intensity distribution of the position detection light in the detection region and accurately detect the position of the target object.

In the aspect of the invention, the position detection light may include infrared light. With such a configuration, since the presence of the position detection light is invisible, for example, when position detection and image display are performed in overlapping regions, there is an advantage that the position detection light does not prevent display of an image.

The optical position detecting apparatus to which the aspect of the invention is applied can be used for configuring a display device with position detecting function. In this case, the display device with position detecting function includes an image generating device that forms an image in a region overlapping the detection region. As the image generating device, a projection display device or a direct-view display device such as a liquid crystal device or an organic electroluminescence device can be used. Such a display device with position detecting function is used in, besides various display apparatuses, electronic apparatuses such as a cellular phone, a car navigation system, a personal computer, a ticket machine, and a bank terminal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention are explained in detail below with reference to the accompanying drawings. In figures referred to in the following explanation, to show layers and members in sizes recognizable on the drawings, scales are varied for each of the layers and the members.

First Embodiment

Overall Configuration of Display Device with Position Detecting Function

Figure 1A:
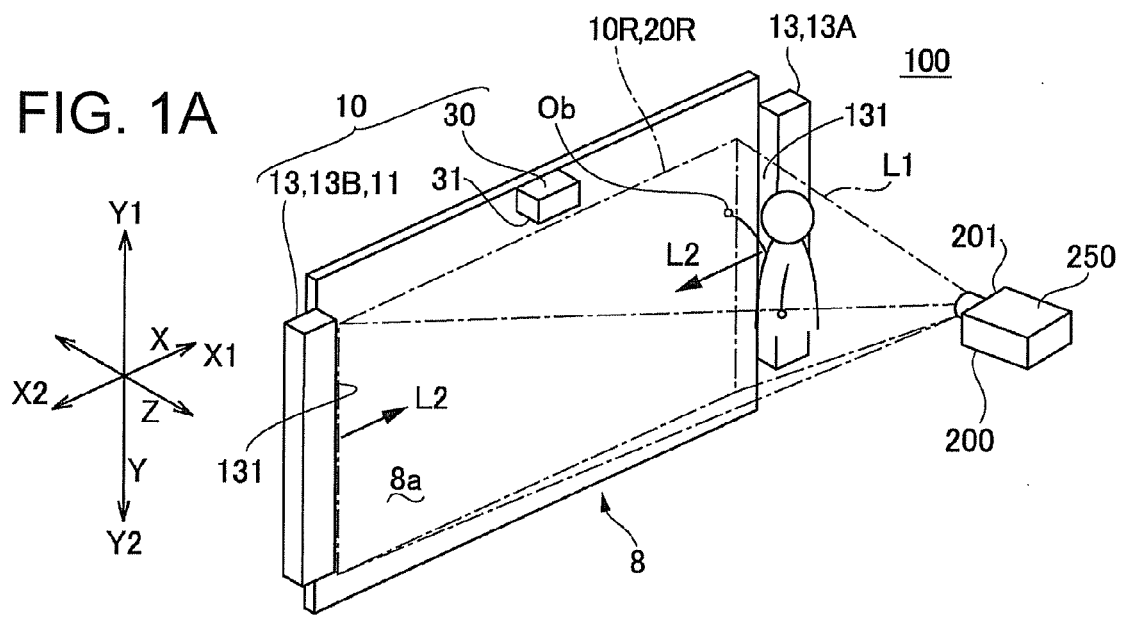
FIGS. 1A and 1B are explanatory diagrams schematically showing the configuration of an optical position detecting apparatus and a display device with position detecting function according to a first embodiment of the invention.
Figure 1B:
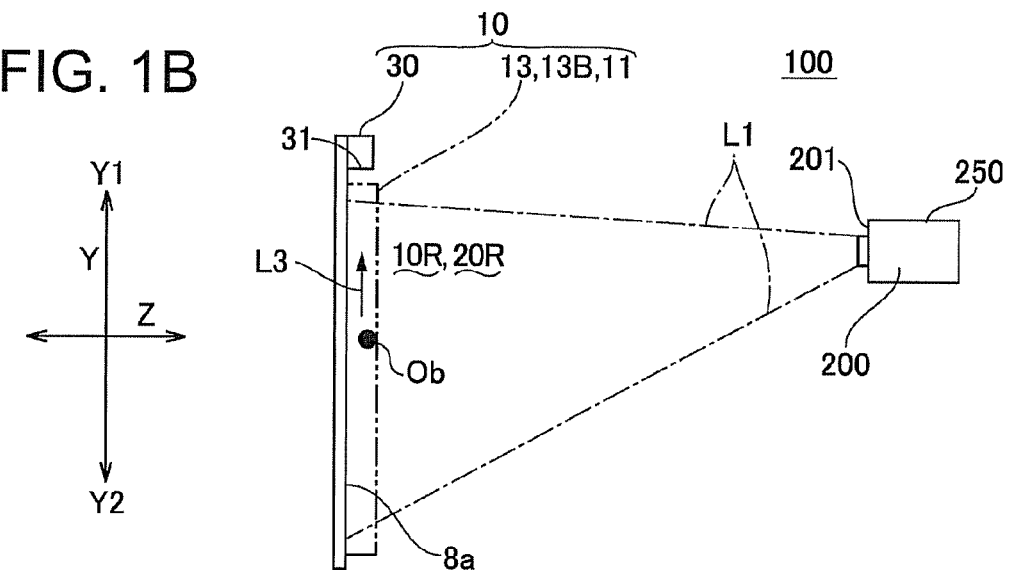

FIGS. 1A and 1B are explanatory diagrams schematically showing the configuration of an optical position detecting apparatus and a display device with position detecting function according to a first embodiment of the invention. FIG. 1A is an explanatory diagram schematically showing a state in which a main part of the display device with position detecting function is viewed from obliquely above. FIG. 1B is an explanatory diagram schematically showing a state in which the display device with position detecting function is viewed from a lateral direction.

A display device with position detecting function 100 shown in FIGS. 1A and 1B is configured as a projection display apparatus including a liquid crystal projector or an image projecting device 200 (an image generating device) called digital micro-mirror device and a screen member 8. The image projecting device 200 expands image display light L1 and projects the image display light L1 from a projection lens system 210 provided in a front section 201 of a housing 250 to the screen member 8.

The display device with position detecting function 100 according to this embodiment includes an optical position detecting apparatus 10. The optical position detecting apparatus 10 has a function of optically detecting the position of a target object Ob in a detection region 10R set on a screen surface 8a side (front of the screen member 8) on which an image is visually recognized in the screen member 8. In this embodiment, the detection region 10R is a region formed in a square when viewed from a normal direction with respect to the screen member 8. The detection region 10R overlaps a region on which an image is projected by the image projecting device 200 in the screen member 8 (an image display region 20R). Therefore, the display device with position detecting function 100 can treat, for example, a coordinate detection result of the target object Ob as input information or the like for designating, for example, a part of the projected image and perform, for example, switching of the image on the basis of such input information.

As explained later in detail, the optical position detecting apparatus 10 includes a light source device for position detection 11 provided on the screen surface 8a side of the screen member 8 and a photodetector 30 including a light receiving unit 31 faced to the detection region 10R on the screen surface 8a side.

The light source device for position detection 11 emits, as the position detection light L2, light having a wavelength region efficiently reflected by the target object Ob such as a finger or a touch pen. More specifically, if the target object Ob is a human body such as a finger, the light source device for position detection 11 emits an infrared ray (in particular, a near infrared ray close to a visible light region, for example, near 850 nm in wavelength) having high reflectance on the surface of the human body or the position detection light L2 having wavelength of 950 nm. In this embodiment, the light source device for position detection 11 emits infrared light having peak wavelength in a wavelength region near 850 nm.

The photodetector 30 includes a light receiving element such as a photodiode or a phototransistor. On the side of the screen surface 8a of the screen member 8, the photodetector 30 faces the light receiving unit 31 to a direction along the screen surface 8a on an outer side of the detection region 10R.

In the optical position detecting apparatus 10 configured in this way, when the light source device for position detection 11 emits the position detection light L2 to the detection region 10R, the position detection light L2 forms an intensity distribution in the detection region 10R. The photodetector 30 detects position detection light L3 reflected on the target object Ob.

Configuration of Optical Position Detecting Apparatus 10

Figure 2A:
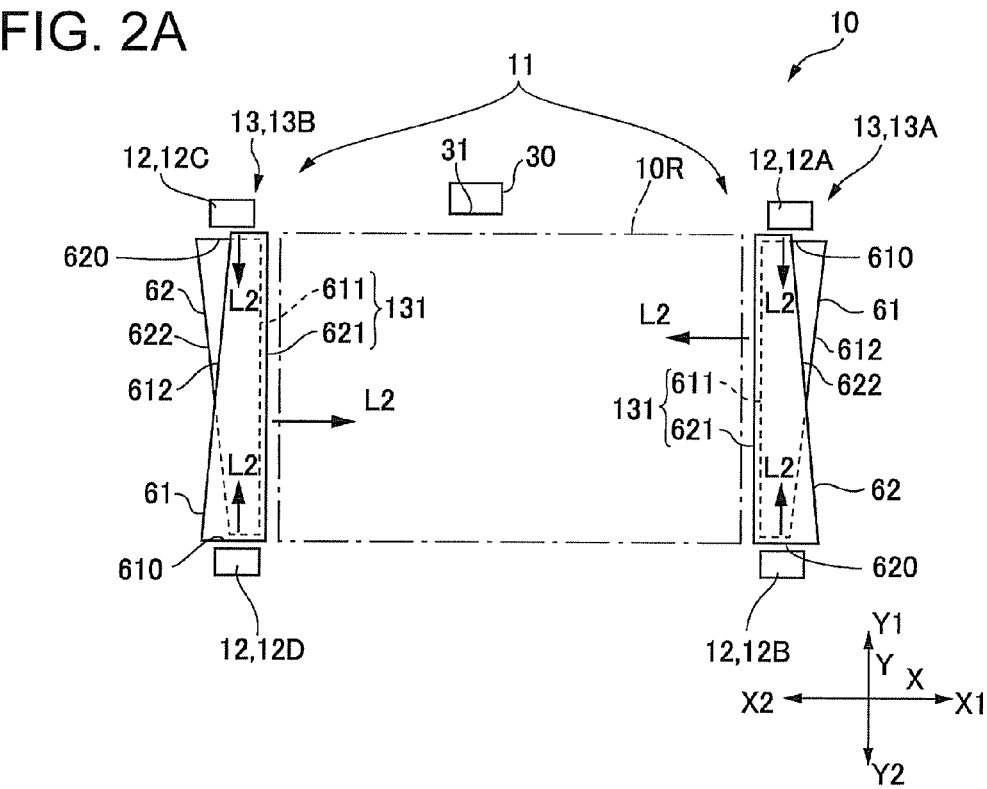
FIGS. 2A and 2B are explanatory diagrams schematically showing the configuration of the optical position detecting apparatus according to the first embodiment of the invention.
Figure 2B:
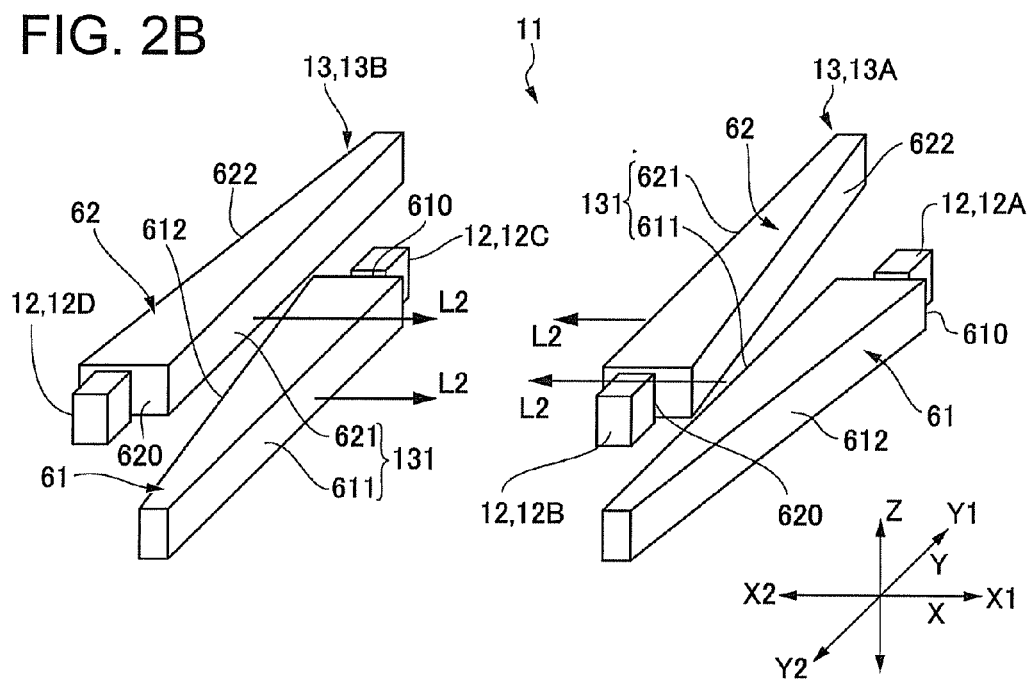

FIGS. 2A and 2B are explanatory diagrams schematically showing the configuration of the optical position detecting apparatus 10 according to the first embodiment of the invention. FIG. 2A is an explanatory diagram showing a plane configuration of the light source device for position detection 11. FIG. 2B is an explanatory diagram of a linear light source unit used in the light source device for position detection 11. FIGS. 3A to 3F are explanatory diagrams showing intensity distributions of position detection lights emitted from linear light source units used in the light source device for position detection 11 in the optical position detecting apparatus 10 according to the first embodiment of the invention.

As shown in FIGS. 1A and 1B and FIG. 2A, in the optical position detecting apparatus 10, the detection region 10R is substantially square and the light source device for position detection 11 includes, on the outer side of the detection region 10R, linear light source units 13 extending along outer peripheral edges of the detection region 10R and a light-source driving unit 14 explained later with reference to FIG. 4. The linear light source units 13 include light emitting sections 131 extending along the outer peripheral edges of the detection region 10R. The linear light source units 13 emit the position detection light L2 from such light emitting sections 131 to the detection region 10R. In this embodiment, the linear light source units 13 are arranged in two places on both sides across the detection region 10R in an X axis direction as a first linear light source unit 13A and a second linear light source unit 13B.

As shown in FIGS. 2A and 2B, the two linear light source units 13 (the first linear light source unit 13A and the second linear light source unit 13B) have the same configuration.

Specifically, the first linear light source unit 13A includes a first light guide member 61 extending in a Y axis direction along the outer peripheral edge located on one side X1 of the X axis direction in the detection region 10R and a light emitting element 12 (a first light emitting element 12A) that emits the position detection light L2 to a light incident section 610 provided at one end of an extending direction of the first light guide member 61. Further, the first linear light source unit 13A includes a second light guide member 62 extending in the Y axis direction along the outer peripheral edge located on one side X1 of the X axis direction in the detection region 10R and the light emitting element 12 (a second light emitting element 12B) that emits the position detection light L2 to a light incident section 620 provided at one end in an extending direction of the second light guide member 62. The first light guide member 61 and the second light guide member 62 are formed of transparent resin such as polycarbonate or acrylic resin. The light emitting elements 12 (the first light emitting element 12A and the second light emitting element 12B) include light emitting diodes that emit infrared light.

The first light guide member 61 and the second light guide member 62 are arranged in parallel to face to directions opposite to each other in an extending direction of the first linear light source unit 13A (the Y axis direction) and overlap in a Z axis direction orthogonal to the extending direction. Therefore, the first light emitting element 12A is located on one side Y1 of the Y axis direction with respect to the first light guide member 61. The second light emission element 12B is located on the other side Y2 of the Y axis direction with respect to the first light guide member 61.

In substantially the same manner as the first linear light source unit 13A, the second linear light source unit 13B includes the first light guide member 61 extending in the Y axis direction along the outer peripheral edge located on the other side X2 of the X axis direction in the detection region 10R and the light emitting element 12 (a first light emitting element 12C) that emits the position detection light L2 to the light incident section 610 provided at one end of the extending direction of the first light guide member 61. The second linear light source unit 13B includes the second light guide member 62 extending in the Y axis direction along the outer peripheral edge located on the other side X2 of the X axis direction in the detection region 10R and the light emitting element 12 (a second light emitting element 12D) that emits the position detection light L2 to the light incident section 620 provided at one end of the extending direction of the second light guide member 62. The first light guide member 61 and the second light guide member 62 are formed of transparent resin such as polycarbonate or acrylic resin. The light emitting elements 12 (the first light emitting element 12C and the second light emitting element 12D) include light emitting diodes that emit infrared light.

In substantially the same manner as in the first linear light source unit 13A, in the second linear light source unit 13B, the first light guide member 61 and the second light guide member 62 are arranged to face to directions opposite to each other in an extending direction of the second linear light source unit 13B (the Y axis direction) and overlap in the Z axis direction orthogonal to the extending direction. Therefore, the first light emitting element 12C is located on one side Y1 of the Y axis direction with respect to the first light guide member 61. The second light emission element 12D is located on the other side Y2 of the Y axis direction with respect to the second light guide member 62.

In the first linear light source unit 13A and the second linear light source unit 13B configured in this way, surfaces facing the side of the detection region 10R in the first light guide members 61 are light emitting sections 611. Such light emitting sections 611 are parallel to the outer peripheral edges of the detection region 10R. Surfaces facing the side of the detection region 10R in the second light guide member 62 are light emitting sections 621. Such light emitting sections 621 are parallel to the outer peripheral edges of the detection region 10R. In this embodiment, the light emitting sections 611 and 612 configure the light emitting sections 131 of the linear light source units 13 (the first linear light source unit 13A and the second linear light source unit 13B).

In both the first linear light source unit 13A and the second linear light source unit 13B, the first light guide members 61 and the second light guide members 62 are formed in a wedge shape when viewed from the Z axis direction. More specifically, surfaces opposed to the light emitting sections 611 in the first light guide members 61 are formed as inclined reflection surfaces 612 formed obliquely to the light emitting sections 611. Surfaces opposed to the light emitting sections 621 in the second light guide members 62 are formed as inclined reflection surfaces 622 formed obliquely to the light emitting sections 621. Therefore, the first light guide members 61 and the second light guide members 62 are formed in a wedge shape with a width dimension narrowed from the sides of the light incident sections 610 and 620 to distal end sides.

In the first linear light source unit 13A and the second linear light source unit 13B, when the position detection light L2 emitted from the light emitting elements 12 (the first light emitting elements 12A and 12C and the second light emitting elements 12B and 12D) is made incident on the first light guide members 61 and the second light guide members 62, the position detection light L2 travels in the first light guide members 61 and the second light guide members 62 while being reflected on the light emitting sections 611 and 621 and the inclined reflection surfaces 612 and 622. While traveling in the first light guide members 61 and the second light guide members 62, the position detection light L2 is emitted from the light emitting sections 611 and 621 to the detection region 10R. The intensity of the position detection light L2 emitted from the light emitting sections 611 and 621 is large on the sides close to the light incident sections 610 and 620 and falls further away from the light incident sections 610 and 620.

Figure 3A:
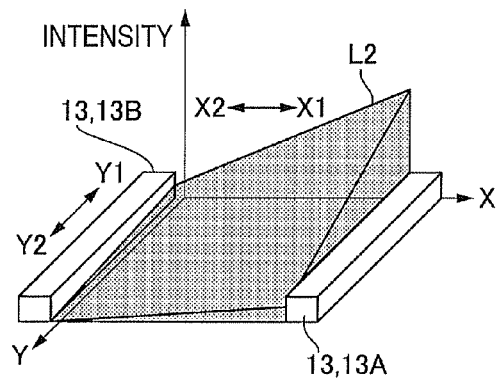
FIGS. 3A to 3F are explanatory diagrams showing intensity distributions of position detection light emitted from linear light source units used in a light source device for position detection in the optical position detecting apparatus according to the first embodiment of the invention.

Such a state is represented as shown in FIGS. 3A to 3F. First, in a first mode in which the first light emitting element 12A is on and the second light emitting element 12B is off in the first linear light source unit 13A, as shown in FIG. 3A, in the extending direction of the first light guide member 61, the intensity of the position detection light L2 emitted from the first light guide member 61 of the first linear light source unit 13A is large on the side on which the first light emitting element 12A is located (one side Y1 of the Y axis direction) and continuously falls further away from the side to the other side Y2 of the Y axis direction. In an emitting direction of the position detection light L2 (a direction orthogonal to the extending direction of the first light guide member 61), the intensity of the position detection light L2 emitted from the first light guide member 61 of the first linear light source unit 13A is large on the side on which the first light guide member 61 is located (one side X1 of the X axis direction) and continuously falls further away from the side to the other side X2 of the X axis direction.

Figure 3D:
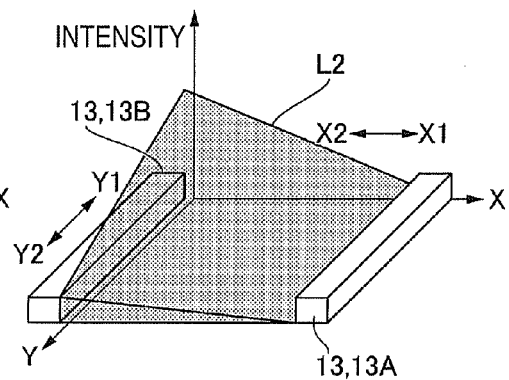
Figure 3B:
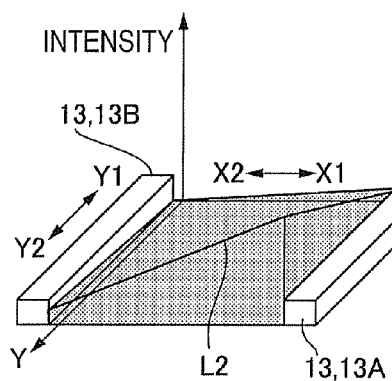

In a second mode in which the first light emitting element 12A is off and the second light emitting element 12B is on in the first linear light source unit 13A, as shown in FIG. 3B, in the extending direction of the second light guide member 62, the intensity of the position detection light L2 emitted from the second light guide member 62 of the first linear light source unit 13A is large on the side on which the second light emitting element 12B is located (the other side Y2 of the Y axis direction) and continuously falls further away from the side to one side Y1 of the Y axis direction. In an emitting direction of the position detection light L2 (a direction orthogonal to the extending direction of the second light guide member 62), the intensity of the position detection light L2 emitted from the second light guide member 62 of the first linear light source unit 13A is large on the side on which the second light guide member 62 is located (one side X1 of the X axis direction) and continuously falls further away from the side to the other side X2 of the X axis direction.

In a third mode in which both the first light emitting element 12A and the second light emitting element 12B are on in the first linear light source unit 13A, the intensity distribution shown in FIG. 3A and the intensity distribution shown in FIG. 3B are added up. Therefore, as shown in FIG. 3C, the intensity of the position detection light L2 emitted from the first linear light source unit 13A is equal in the extending direction of the first linear light source unit 13A. In an emitting direction of the position detection light L2 (a direction orthogonal to the extending direction of the first light guide member 61), the intensity of the position detection light L2 continuously falls from the side on which the first linear light source unit 13A is located (one side X1 of the X axis direction) to the other side X2 of the X axis direction.

Similarly, in a first mode in which the first light emitting element 12C is on and the second light emitting element 12D is off in the second linear light source unit 13B, as shown in FIG. 3D, in the extending direction of the first light guide member 61, the intensity of the position detection light L2 emitted from the first light guide member 61 of the second linear light source unit 13B is large on the side on which the first light emitting element 12C is located (one side Y1 of the Y axis direction) and continuously falls further away from the side to the other side Y2 of the Y axis direction. In an emitting direction of the position detection light L2 (a direction orthogonal to the extending direction of the first light guide member 61), the intensity of the position detection light L2 emitted from the first light guide member 61 of the second linear light source unit 13B is large on the side on which the first light guide member 61 is located (the other side X2 of the X axis direction) and continuously falls further away from the side to one side X1 of the X axis direction.

Figure 3E:
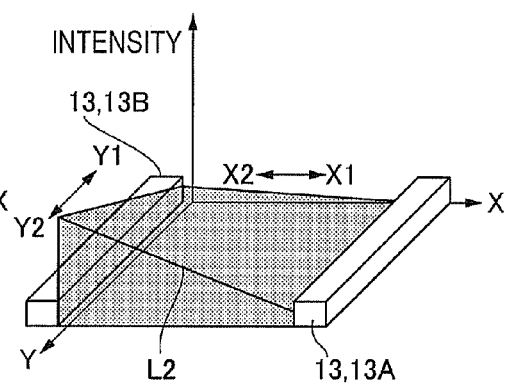
Figure 3C:
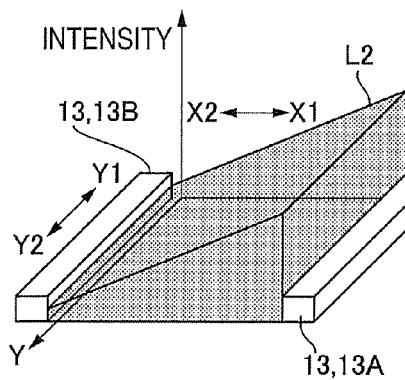

In a second mode in which the first light emitting element 12C is off and the second light emitting element 12D is on in the second linear light source unit 13B, as shown in FIG. 3E, in the extending direction of the second light guide member 62, the intensity of the position detection light L2 emitted from the second light guide member 62 of the second linear light source unit 13B is large on the side on which the second light emitting element 12D is located (the other side Y2 of the Y axis direction) and continuously falls further away from the side to one side Y1 of the Y axis direction. In an emitting direction of the position detection light L2 (a direction orthogonal to the extending direction of the second light guide member 62), the intensity of the position detection light L2 emitted from the second light guide member 62 of the second linear light source unit 13B is large on the side on which the second light guide member 62 is located (the other side X2 of the X axis direction) and continuously falls further away from the side to one side X1 of the X axis direction.

Figure 3F:
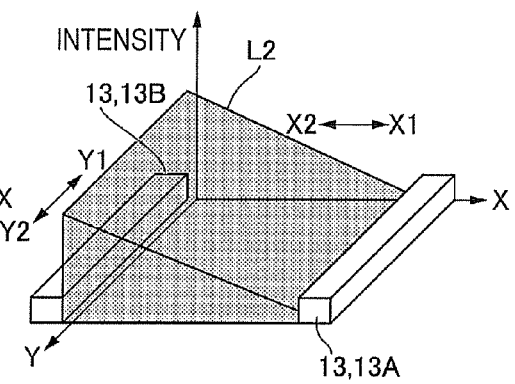

In a third mode in which both the first light emitting element 12C and the second light emitting element 12D are on in the second linear light source unit 13B, the intensity distribution shown in FIG. 3D and the intensity distribution shown in FIG. 3E are added up. Therefore, as shown in FIG. 3F, the intensity of the position detection light L2 emitted from the second linear light source unit 13B is equal in the extending direction of the second linear light source unit 13B. In an emitting direction of the position detection light L2 (a direction orthogonal to the extending direction of the first light guide member 61), the intensity of the position detection light L2 continuously falls from the side on which the second linear light source unit 13B is located (the other side X2 of the X axis direction) to one side X1 of the X axis direction.

Electric Configuration of Optical Position Detecting Apparatus 10

Figure 4:
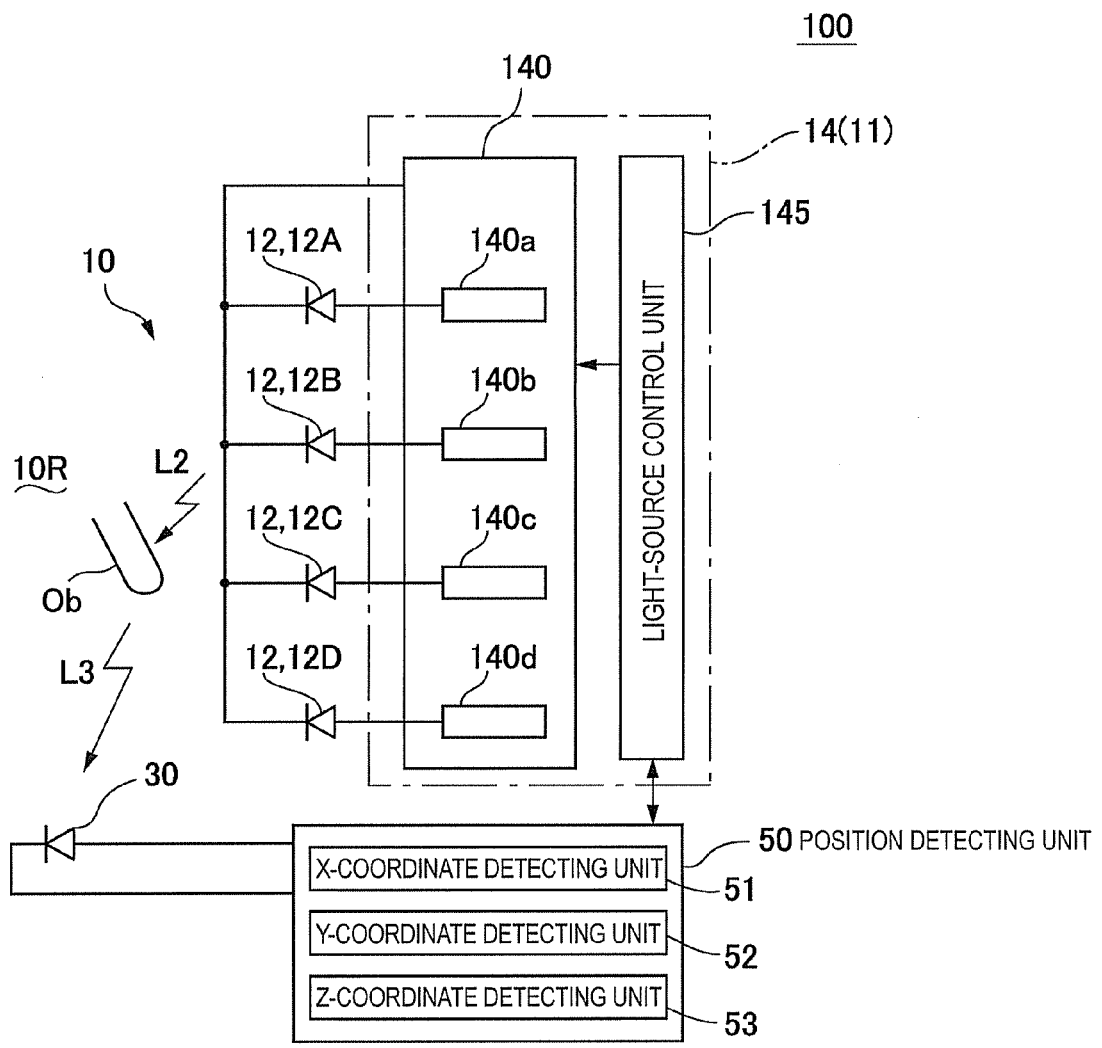
FIG. 4 is an explanatory diagram showing an electric configuration and the like of the optical position detecting apparatus according to the first embodiment of the invention.

FIG. 4 is an explanatory diagram showing an electric configuration and the like of the optical position detecting apparatus 10 according to the first embodiment of the invention. As shown in FIG. 4, the optical position detecting apparatus 10 includes a light-source driving unit 14 that drives each of the plural light emitting elements 12 (the light emitting elements 12A to 12D) and a position detecting device 50 that detects the position of the target object Ob on the basis of a detection result in the photodetector 30. The light-source driving unit 14 includes driving circuits 140 (driving circuits 140a to 140d) respectively corresponding to the plural light emitting elements 12 and a light-source control unit 145 that controls turn-on of each of the plural light emitting elements 12 via the driving circuit 140. The position detecting device 50 includes an X-coordinate detecting unit 51 that detects a position in the X axis direction (an X coordinate) of the target object Ob and a Y-coordinate detecting unit 52 that detects a position in the Y axis direction (a Y coordinate) of the target object Ob. The X axis direction and the Y axis direction cross at a right angle in a plane parallel to the screen member 8. Further, the position detecting device 50 includes a Z-coordinate detecting unit 53 that detects a position of the target object Ob in the Z axis direction orthogonal to a screen 85 (a Z coordinate). The light-source control unit 145 and the position detecting device 50 are connected by a signal line. Driving for the light emitting elements 12 and detection operation in the position detecting device 50 are performed in association with each other.

Basic Principle of Coordinate Detection

In the display device with position detecting function 100 according to this embodiment, the position detecting device 50 detects the position of the target object Ob in the detection region 10R making use of an intensity distribution of the position detection light L2 formed on the screen surface 8a side. A light intensity distribution and a principle of coordinate detection are explained with reference to FIGS. 5A to 5C.

Figure 5A:
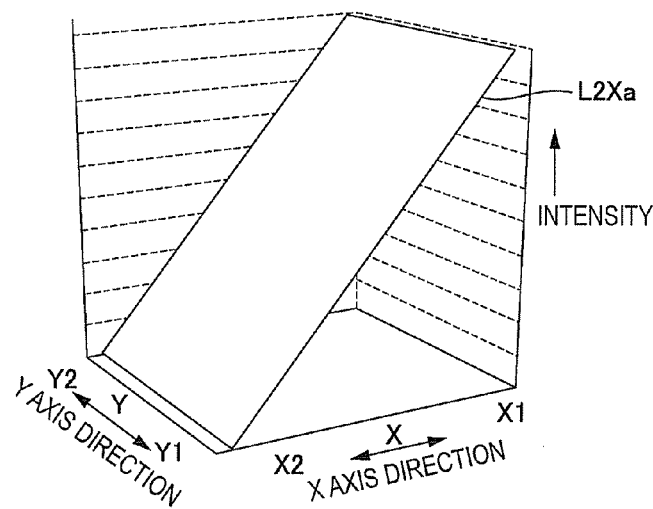
FIGS. 5A to 5C are explanatory diagrams showing an intensity distribution of the position detection light used in the optical position detecting apparatus according to the first embodiment of the invention and basic operation content in a position detecting device.
Figure 5B:
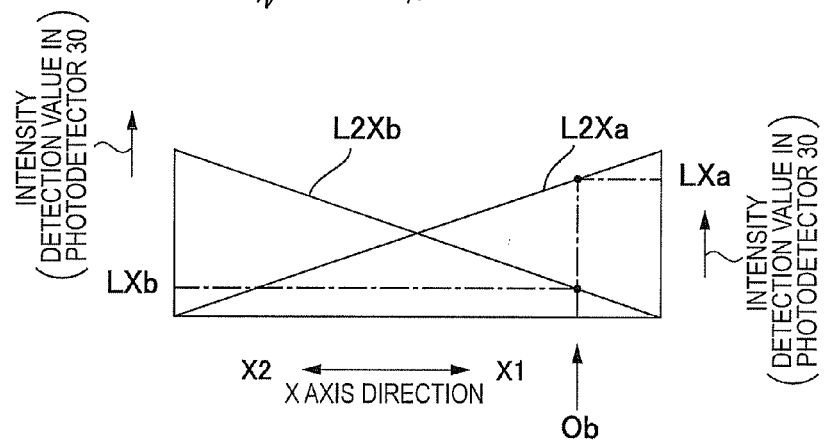
Figure 5C:
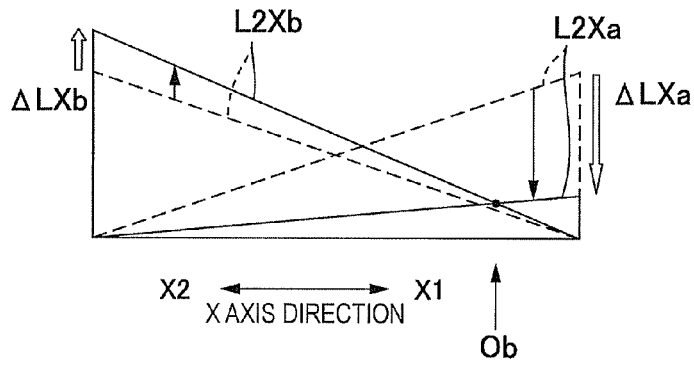

FIGS. 5A to 5C are explanatory diagrams of an intensity distribution of the position detection light L2 used in the optical position detecting apparatus 10 according to this embodiment and basic operation content in the position detecting device 50. FIG. 5A is an explanatory diagram showing an intensity distribution in the X axis direction of the position detection light L2. FIG. 5B is an explanatory diagram showing the intensity of the position detection light L2 reflected on a target object. FIG. 5C is an explanatory diagram showing a state in which an intensity distribution of the position detection light L2 is adjusted such that the intensity of the position detection light L2 reflected on the target object is equal.

In the optical position detecting apparatus 100 shown in FIGS. 1A and 1B to FIG. 4, when the light emitting elements 12 emit the position detection light L2 to light guide members (the first light guide members 61 and the second light guide members 62), the position detection light L2 travels while propagating through the light guide members (the first light guide members 61 and the second light guide members 62) and is emitted to the detection region 10R from the light emitting sections 131 (the light emitting sections 611 and 621). When the position detection light L2 is emitted, emission intensity of the position detection light L2 changes according to a distance from the light incident sections 610 and 620 (a propagation distance in the light guide members). Since the intensity of the position detection light L2 in the detection region 10R changes according to a distance from the light guide members (the first light guide members 61 and the second light guide members 62), an intensity distribution of the position detection light L2 explained later is formed in the detection region 10R.

Therefore, when an X coordinate is detected, as shown in FIGS. 5A and 5B, first, in a first period for X coordinate detection, a first intensity distribution for X coordinate detection L2Xa in which intensity monotonously decreases from one side X1 to the other side X2 of the X axis direction is formed. Thereafter, in a second period for X coordinate detection, a second intensity distribution for X coordinate detection L2Xb in which intensity monotonously decreases from the other side X2 to one side X1 of the X axis direction is formed. In the first period for X coordinate detection, the first intensity distribution for X coordinate detection L2Xa in which intensity linearly decreases from one side X1 to the other side X2 of the X axis direction may be formed. Thereafter, in the second period for X coordinate detection, the second intensity distribution for X coordinate detection L2Xb in which intensity linearly decreases from the other side X2 to one side X1 of the X axis direction may be formed. Therefore, when the target object Ob is arranged in the detection region 10R, the position detection light L2 is reflected by the target object Ob and a part of reflected light of the position detection light L2 is detected by the photodetector 30. If the first intensity distribution for X coordinate detection L2Xa formed in the first period for X coordinate detection and the second intensity distribution for X coordinate detection L2Xb formed in the second period for X coordinate detection are distributions set in advance, an X coordinate of the target object Ob can be detected on the basis of a detection result in the photodetector 30 according to, for example, a method explained below.

For example, in a first method, a difference between the first intensity distribution for X coordinate detection L2Xa and the second intensity distribution for X coordinate detection L2Xb shown in FIG. 5B is utilized. More specifically, since the first intensity distribution for X coordinate detection L2Xa and the second intensity distribution for X coordinate detection L2Xb are the distributions set in advance, the difference between the first intensity distribution for X coordinate detection L2Xa and the second intensity distribution for X coordinate detection L2Xb is a function set in advance. Therefore, if a difference between a detection value Lxa in the photodetector 30 obtained when the first intensity distribution for X coordinate detection L2Xa is formed in the first period for X coordinate detection and a detection value Lxb in the photodetector 30 obtained when the second intensity distribution for X coordinate detection L2Xb is formed in the second period for X coordinate detection is calculated, the X-coordinate detecting unit 51 of the position detecting device 50 can detect an X coordinate of the target object Ob. With such a method, even when an infrared component included in environment light other than the position detection light L2, for example, external light is made incident on the photodetector 30, the intensity of the infrared component included in the environment light is offset when the difference between the detection values LXa and LXb is calculated. Therefore, the infrared component included in the environment light does not affect detection accuracy. It is also possible to detect an X coordinate of the target object Ob according to a ratio between the detection value LXa and the detection value LXb.

A second method is a method of detecting an X coordinate of the target object Ob on the basis of an adjustment amount in adjustment of a control amount (driving current) for the light emitting elements 12 such that the detection value Lxa in the photodetector 30 obtained when the first intensity distribution for X coordinate detection L2Xa is formed in the first period for X coordinate detection and the detection value Lxb in the photodetector 30 obtained when the second intensity distribution for X coordinate detection L2Xb is formed in the second period for X coordinate detection are equal. Such a method can be applied when the first intensity distribution for X coordinate detection L2Xa and the second intensity distribution for X coordinate detection L2Xb shown in FIG. 5B linearly change with respect to an X coordinate.

As shown in FIG. 5B, in the first period for X coordinate detection and the second period for X coordinate detection, the first intensity distribution for X coordinate detection L2Xa and the second intensity distribution for X coordinate detection L2Xb are formed such that absolute values thereof are equal and are in opposite directions in the X axis direction. If the detection value LXa in the photodetector 30 in the first period for X coordinate detection and the detection value LXb in the photodetector 30 in the second period for X coordinate detection are equal in this state, it is seen that the target object Ob is located in the center in the X axis direction.

On the other hand, when the detection value LXa in the photodetector 30 in the first period for X coordinate detection and the detection value LXb in the photodetector 30 in the second period for X coordinate detection are different, a control amount (driving current) for the light emitting elements 12 is adjusted such that the detection values LXa and LXb are equal. As shown in FIG. 5C, the first intensity distribution for X coordinate detection L2Xa is formed in the first period for X coordinate detection again and the second intensity distribution for X coordinate detection L2Xb is formed in the second period for X coordinate detection again. As a result, if the detection value LXa in the photodetector 30 in the first period for X coordinate detection and the detection value LXb in the photodetector 30 in the second period for X coordinate detection are equal, the X-coordinate detecting unit 51 of the position detecting device 50 can detect an X coordinate of the target object Ob according to a ratio, a difference, or the like between an adjustment amount ΔLXa of a control amount for the light emitting elements 12 in the first period for X coordinate detection and an adjustment amount ΔLXb of a control amount for the light emitting element 12 in the second period for X coordinate detection. With such a method, even when an infrared component included in environment light other than the position detection light L2, for example, external light is made incident on the photodetector 30, the intensity of the infrared component included in the environment light is offset when the adjustment of the control amount for the light emitting elements 12 is performed such that the detection values LXa and LXb are equal. Therefore, the infrared component included in the environment light does not affect detection accuracy.

A third method is, like the second method, a method of detecting an X coordinate of the target object Ob on the basis of an adjustment amount in adjustment of a control amount (driving current) for the light emitting elements 12 such that the detection value Lxa in the photodetector 30 obtained when the first intensity distribution for X coordinate detection L2Xa is formed in the first period for X coordinate detection and the detection value Lxb in the photodetector 30 obtained when the second intensity distribution for X coordinate detection L2Xb is formed in the second period for X coordinate detection are equal. Such a method can be applied when the first intensity distribution for X coordinate detection L2Xa and the second intensity distribution for X coordinate detection L2Xb shown in FIG. 5B linearly change with respect to an X coordinate.

As shown in FIG. 5B, in the first period for X coordinate detection and the second period for X coordinate detection, the first intensity distribution for X coordinate detection L2Xa and the second intensity distribution for X coordinate detection L2Xb are formed such that absolute values thereof are equal and are in opposite directions in the X axis direction. If the detection value LXa in the photodetector 30 in the first period for X coordinate detection and the detection value LXb in the photodetector 30 in the second period for X coordinate detection are equal in this state, it is seen that the target object Ob is located in the center in the X axis direction.

On the other hand, when the detection value LXa in the photodetector 30 in the first period for X coordinate detection and the detection value LXb in the photodetector 30 in the second period for X coordinate detection are different, for example, a control amount (driving current) for the light emitting elements 12 in the period with a lower detection value or the period with a higher detection value is adjusted such that the detection values LXa and LXb are equal. The first intensity distribution for X coordinate detection L2Xa is formed in the first period for X coordinate detection again and the second intensity distribution for X coordinate detection L2Xb is formed in the second period for X coordinate detection again. In an example shown in FIG. 5C, for example, a control amount for the light emitting elements 12 in the first period for X coordinate detection is reduced by the adjustment amount ΔLXa. Alternatively, a control amount for the light emitting elements 12 in the second period for X coordinate detection is increased by the adjustment amount ΔLXb. As a result, if the detection value LXa in the photodetector 30 in the first period for X coordinate detection and the detection value LXb in the photodetector 30 in the second period for X coordinate detection are equal, the X-coordinate detecting unit 51 of the position detecting device 50 can detect an X coordinate of the target object Ob according to a ratio, a difference, or the like between the control amount for the light emitting elements 12 in the first period for X coordinate detection after the adjustment and the control amount for the light emitting elements 12 in the second period for X coordinate detection after the adjustment. With such a method, even when an infrared component included in environment light other than the position detection light L2, for example, external light is made incident on the photodetector 30, the intensity of the infrared component included in the environment light is offset when the adjustment of the control amount for the light emitting elements 12 is performed such that the detection values LXa and LXb are equal. Therefore, the infrared component included in the environment light does not affect detection accuracy.

Whichever of the first to third methods is adopted, similarly, if, after a first intensity distribution for Y coordinate detection in which intensity monotonously decreases from one side Y1 to the other side Y2 of the Y axis direction is formed in the first period for Y coordinate detection, a second intensity distribution for Y coordinate detection in which intensity monotonously decreases from the other side Y2 to one side Y1 of the Y axis direction is formed in the second period for Y coordinate detection, the Y-coordinate detecting unit 52 of the position detecting device 50 can detect a Y coordinate of the target object Ob.

If an intensity distribution in the Z axis direction is formed in a Z coordinate detection period, the Z-coordinate detecting unit 53 of the position detecting device 50 can detect a Z coordinate of the target object Ob.

In acquiring position information in the detection region 10R of the target object Ob on the basis of a detection result in the photodetector 30 as explained above, for example, it is possible to adopt a configuration for using a microprocessor unit (MPU) as the position detecting device 50 and performing processing according to execution of predetermined software (an operation program) by the microprocessor unit. It is also possible to adopt a configuration for performing processing in a signal processing unit including hardware such as a logic circuit.

X Coordinate Detecting Operation

Figures 6A, 6B:
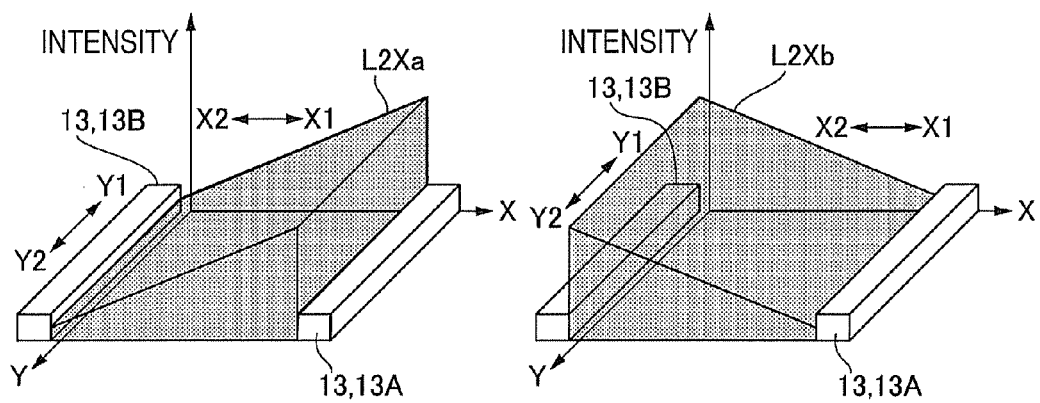
FIGS. 6A to 6D are explanatory diagrams showing states in which intensity distributions of position detection light are formed in the optical position detecting apparatus according to the first embodiment of the invention.
Figures 6C, 6D:
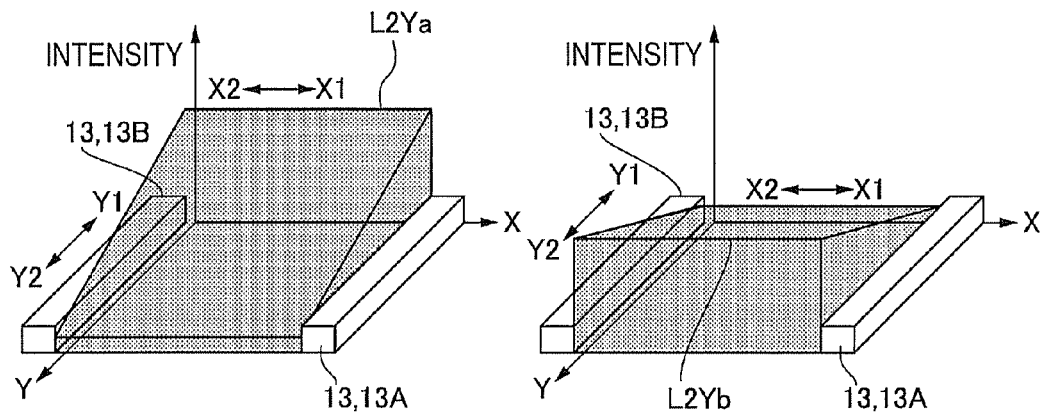

Operation for detecting the position of the target object Ob in the detection region 10R in the optical position detecting apparatus 10 according to this embodiment is explained with reference to FIGS. 6A to 6D. FIGS. 6A to 6D are explanatory diagrams showing states in which an intensity distribution of the position detection light L2 is formed in the optical position detecting apparatus 10 according to the first embodiment of the invention. FIGS. 6A and 6B are explanatory diagrams of an intensity distribution for X coordinate detection in detecting an X coordinate of the target object Ob. FIGS. 6C and 6D are explanatory diagrams of an intensity distribution for Y coordinate detection in detecting a Y coordinate of the target object Ob.

In the display device with position detecting function 100 according to this embodiment, to detect XY coordinates of the target object Ob in the detection region 10R, an X coordinate is detected in the first period for X coordinate detection and the second period for X coordinate detection and a Y coordinate is detected in a first period for Y coordinate detection and a second period for Y coordinate detection as explained below. Further, in the display device for position detecting function 100 according to this embodiment, a Z coordinate is detected in the Z coordinate detection period. Time of each of the first period for X coordinate detection, the second period for Y coordinate detection, and the Z coordinate detection period is, for example, about several milliseconds.

More specifically, to detect an X coordinate of the target object Ob in the detection region 10R, first, in the first period for X coordinate detection, the light-source control unit 145 of the light-source driving unit 14 shown in FIG. 4 controls the light emitting elements 12 via the driving circuit 140 to turn on the first light emitting element 12A and the second light emitting element 12B of the first linear light source unit 13A shown in FIGS. 2A and 2B and, on the other hand, turn off the first light emitting element 12C and the second light emitting element 12D of the second linear light source unit 13B. As a result, as shown in FIG. 6A, the first intensity distribution for X coordinate detection L2Xa (an intensity distribution for first coordinate detection/a first intensity distribution for first coordinate detection) in which the intensity of the position detection light L2 monotonously decreases from one side X1 to the other side X2 of the X axis direction is formed. In the first intensity distribution for X coordinate detection L2Xa in this embodiment, the intensity of the position detection light L2 continuously decreases substantially linearly from one side X1 to the other side X2 of the X axis direction. In such a first intensity distribution for X coordinate detection L2Xa, a position in the X axis direction and the intensity of the position detection light L2 have a fixed relation. In the first intensity distribution for X coordinate detection L2Xa, the intensity of the position detection light L2 is fixed in the Y axis direction. Therefore, an amount of light reflected on the target object Ob and detected by the photodetector 30 is a value that is proportional to the intensity of the position detection light L2 in the first intensity distribution for X coordinate detection L2Xa and specified by a position in the X axis direction of the target object Ob.

Subsequently, in the second period for X coordinate detection, the light-source control unit 145 of the light-source driving unit 14 shown in FIG. 4 controls the light emitting elements 12 via the driving circuit 140 to turn off the first light emitting element 12A and the second light emitting element 12B of the first linear light source unit 13A shown in FIGS. 2A and 2B and, on the other hand, turn on the first light emitting element 12C and the second light emitting element 12D of the second linear light source unit 13B. As a result, as shown in FIG. 6B, the second intensity distribution for X coordinate detection L2Xb (an intensity distribution for first coordinate detection/a second intensity distribution for first coordinate detection) in which the intensity of the position detection light L2 monotonously decreases from the other side X2 to one side X1 of the X axis direction is formed. In the second intensity distribution for X coordinate detection L2Xb in this embodiment, the intensity of the position detection light L2 continuously decreases substantially linearly from the other X2 to one side X1 of the X axis direction. In such a second intensity distribution for X coordinate detection L2Xb, a position in the X axis direction and the intensity of the position detection light L2 have a fixed relation. In the second intensity distribution for X coordinate detection L2Xb, the intensity of the position detection light L2 is fixed in the Y axis direction. Therefore, an amount of light reflected on the target object Ob and detected by the photodetector 30 is a value that is proportional to the intensity of the position detection light L2 in the second intensity distribution for X coordinate detection L2Xb and specified by a position in the X axis direction of the target object Ob.

Therefore, a difference or a ratio between a light amount detected by the photodetector 30 in the first period for X coordinate detection and a light amount detected by the photodetector 30 in the second period for X coordinate detection is a value specified by the position of the target object Ob. Therefore, the X-coordinate detecting unit 51 of the position detecting device 50 can detect an X coordinate of the target object Ob on the basis of a detection result in the photodetector 30 in the first period for X coordinate detection and a detection result in the photodetector 30 in the second period for X coordinate detection.

Y Coordinate Detecting Operation

To detect a Y coordinate of the target object Ob in the detection region 10R, first, in the first period for Y coordinate detection, the light-source control unit 145 of the light-source driving unit 14 shown in FIG. 4 controls the light emitting elements 12 via the driving circuit 140 to turn on the first light emitting element 12A of the first linear light source unit 13A and the first light emitting element 12C of the second linear light source unit 13B shown in FIGS. 2A and 2B and, on the other hand, turn off the second light emitting element 12B of the first linear light source unit 13A and the second light emitting element 12D of the second linear light source unit 13B. As a result, as shown in FIG. 6C, the first intensity distribution for Y coordinate detection L2Ya (an intensity distribution for second coordinate detection/a first intensity distribution for second coordinate detection) in which the intensity of the position detection light L2 monotonously decreases from one side Y1 to the other side Y2 of the Y axis direction is formed. In the first intensity distribution for Y coordinate detection L2Ya in this embodiment, the intensity of the position detection light L2 continuously decreases substantially linearly from one side Y1 to the other side Y2 of the Y axis direction. In such a first intensity distribution for Y coordinate detection L2Ya, a position in the Y axis direction and the intensity of the position detection light L2 have a fixed relation. In the first intensity distribution for Y coordinate detection L2Ya, the intensity of the position detection light L2 is fixed in the X axis direction. Therefore, an amount of light reflected on the target object Ob and detected by the photodetector 30 is a value that is proportional to the intensity of the position detection light L2 in the first intensity distribution for Y coordinate detection L2Ya and specified by a position in the Y axis direction of the target object Ob.

Subsequently, in the second period for Y coordinate detection, the light-source control unit 145 of the light-source driving unit 14 shown in FIG. 4 controls the light emitting elements 12 via the driving circuit 140 to turn off the first light emitting element 12A of the first linear light source unit 13A and the first light emitting element 12C of the second linear light source unit 13B shown in FIGS. 2A and 2B and, on the other hand, turn on the second light emitting element 12B of the first linear light source unit 13A and the second light emitting element 12D of the second linear light source unit 13B. As a result, as shown in FIG. 6D, the second intensity distribution for Y coordinate detection L2Yb (an intensity distribution for second coordinate detection/a second intensity distribution for second coordinate detection) in which the intensity of the position detection light L2 monotonously decreases from the other side Y2 to one side Y1 of the Y axis direction is formed. In the second intensity distribution for Y coordinate detection L2Yb in this embodiment, the intensity of the position detection light L2 continuously decreases substantially linearly from the other Y2 to one side Y1 of the Y axis direction. In such a second intensity distribution for Y coordinate detection L2Yb, a position in the Y axis direction and the intensity of the position detection light L2 have a fixed relation. In the second intensity distribution for Y coordinate detection L2Yb, the intensity of the position detection light L2 is fixed in the X axis direction. Therefore, an amount of light reflected on the target object Ob and detected by the photodetector 30 is a value that is proportional to the intensity of the position detection light L2 in the second intensity distribution for Y coordinate detection L2Yb and specified by a position in the Y axis direction of the target object Ob.

Therefore, a difference or a ratio between a light amount detected by the photodetector 30 in the first period for Y coordinate detection and a light amount detected by the photodetector 30 in the second period for Y coordinate detection is a value specified by the position of the target object Ob. Therefore, the Y-coordinate detecting unit 52 of the position detecting device 50 can detect a Y coordinate of the target object Ob on the basis of a detection result in the photodetector 30 in the first period for Y coordinate detection and a detection result in the photodetector 30 in the second period for Y coordinate detection.

Z Coordinate Detecting Operation

In the display device with position detecting function 100 according to this embodiment, to detect a Z coordinate of the target object Ob in the detection region 10R, all the light emitting elements 12 (the light emitting elements 12A to 12D) shown in FIGS. 2A and 2B are turned on. As a result, an intensity distribution for Z coordinate detection in which the intensity of the position detection light L2 monotonously decreases in a direction away from the screen member 8 in the Z axis direction is formed. In such an intensity distribution for Z coordinate detection, a position in the Z axis direction and the intensity of the position detection light L2 have a fixed relation. Therefore, an amount of light reflected on the target object Ob and detected by the photodetector 30 is a value that is proportional to the intensity of the position detection light L2 in the intensity distribution for Z coordinate detection and specified by a position in the Z axis direction of the target object Ob. Therefore, the Z-coordinate detecting unit 53 of the position detecting device 50 can detect a Z coordinate of the target object Ob on the basis of a detection result of the photodetector 30 in the Z coordinate detection period.

Main Effects of this Embodiment

As explained above, in the display device with position detecting function 100 according to this embodiment, when the light emitting elements 12 emit the position detection light L2, an intensity distribution of the position detection light L2 is formed on the screen surface 8a side. Therefore, when the position detection light L2 is reflected by the target object Ob located in the detection region 10R set on the screen surface 8a side, such light is detected by the photodetector 30. Therefore, if a relation between a position in the detection region 10R and the intensity of the position detection light L2 is grasped in advance, it is possible to detect the position of the target object Ob on the basis of a light reception result of the photodetector 30. Accordingly, since it is unnecessary to arrange a large number of optical elements along the detection region 10R, it is possible to configure the optical position detecting apparatus 10 that is manufactured at low cost and consumes low power. Further, since the position detection light L2 includes infrared light, there is an advantage that the position detection light L2 does not prevent display of an image.

In this embodiment, the linear light source units 13 are used and, in such linear light source units 13, it is easy to control emission intensity of the position detection light L2 in the extending direction of the linear light source units 13. The intensity of the position detection light L2 in the emitting direction from the linear light source units 13 is surely specified by a distance from the linear light source units 13. Therefore, it is possible to surely form a proper intensity distribution of the position detection light L2 in the detection region 10R. Accordingly, it is possible to detect the position of the target object Ob at high accuracy.

Further, the linear light source units 13 include the light emitting elements 12 that emit the position detection light L2 and the light guide members (the first light guide members 61 and the second light guide members 62) extending along the outer peripheral edges of the detection region 10R. Therefore, since the light emitting elements 12 can be used as light sources, the linear light source units 13 are inexpensive. There is an advantage that the emission intensity of the position detection light L2 in the extending direction of the linear light source units 13 can be surely controlled by the first light guide members 61 and the second light guide members 62.

Furthermore, in this embodiment, the linear light source units 13 include the first light guide members 61 and the second light guide members 62 arranged to face to the directions opposite to each other in the extending direction of the linear light source units 13 and overlap in the direction orthogonal to the extending direction. Therefore, it is possible to realize, simply by controlling turn-on and turn-off of the two light emitting elements 12 provided in each of the linear light source units 13, a first mode in which an emitted light amount decreases from one side to the other side of the extending direction of the linear light source units 13, a second mode in which an emitted light amount decreases from the other side to one side of the extending direction of the linear light source units 13, and a third mode in which an emitted light amount is equal from one side to the other side of the extending direction of the linear light source units 13. Therefore, it is possible to form three kinds of intensity distributions and use the respective intensity distributions for detection of the position of the target object Ob.

Moreover, the linear light source units 13 are arranged as the first linear light source unit 13A and the second linear light source unit 13B on both the sides of the detection region 10R. Therefore, as explained with reference to FIGS. 6A to 6D, it is possible to form, at different timings, a first intensity distribution for X coordinate detection, a second intensity distribution for X coordinate detection, a first intensity distribution for Y coordinate detection, and a second intensity distribution for Y coordinate detection. Therefore, it is possible to detect two-dimensional coordinates of the target object Ob at high accuracy.

In this embodiment, since the photodetector 30 faces the light receiving unit 31 to the direction along the screen surface 8a, a distance away from the screen surface 8a in which the target object Ob can be detected is limited. Therefore, only a detection result of the target object Ob in a position close to the screen surface 8a can be detected as information. A detection result of the target object Ob in a position away from the screen surface 8a is not detected as information. Therefore, information is not input by mistake by the target object Ob in a state away from the screen surface 8a.

First Modification of First Embodiment

Figure 7:
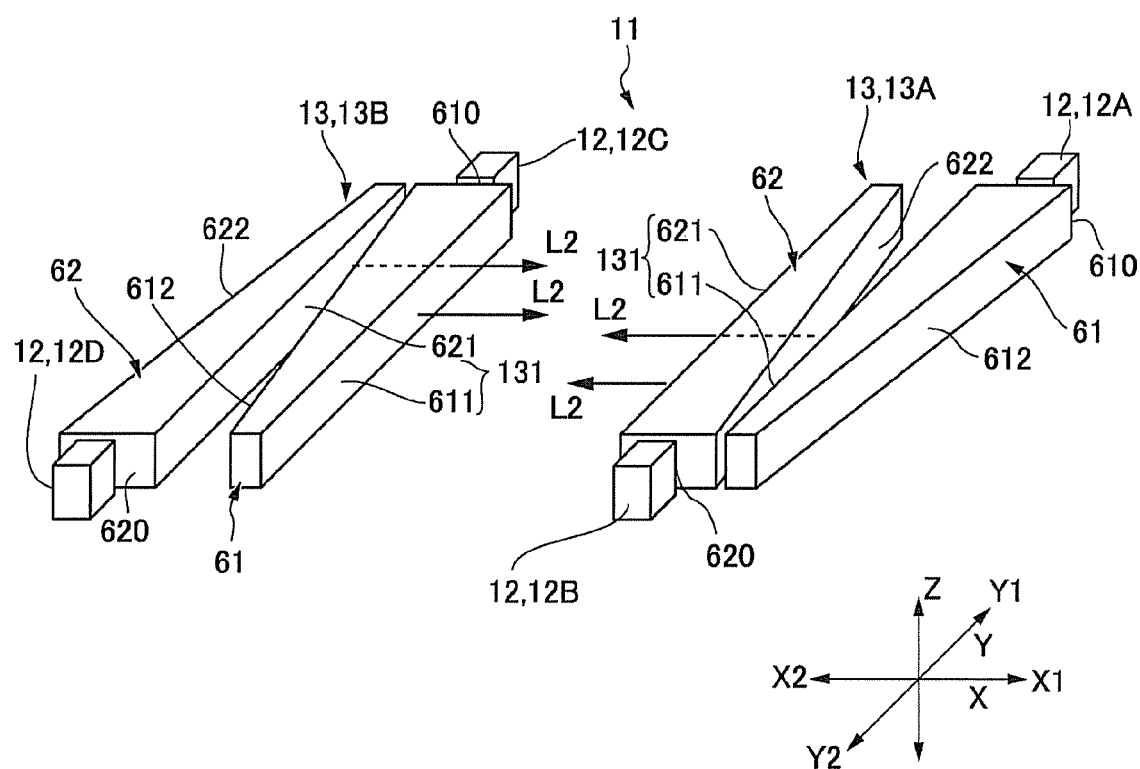
FIG. 7 is an explanatory diagram of a linear light source unit used in an optical position detecting apparatus according to a first modification of the first embodiment of the invention.

FIG. 7 is an explanatory diagram of linear light source units used in the optical position detecting apparatus 10 according to a first modification of the first embodiment of the invention. Since a basic configuration of this modification is the same as that of the first embodiment, the same components are denoted by the same reference numerals and signs and explanation of the components is omitted.

As explained with reference to FIGS. 2A and 2B, in the first embodiment, the first light guide members 61 and the second light guide members 62 are arranged in parallel to overlap in the Z axis direction orthogonal to the extending direction (the Y axis direction). However, in this modification, as shown in FIG. 7, the first light guide members 61 and the second light guide members 62 are arranged in parallel to also overlap in the X axis direction orthogonal to the extending direction (the Y axis direction). In this modification, in the second linear light source unit 13B, as in the first linear light source unit 13A, the first light guide member 61 and the second light guide member 62 are arranged in parallel in the X axis direction orthogonal to the extending direction (the Y axis direction). With such a configuration, effects same as those of the first embodiment can be realized.

Second Modification of First Embodiment

Figure 8:
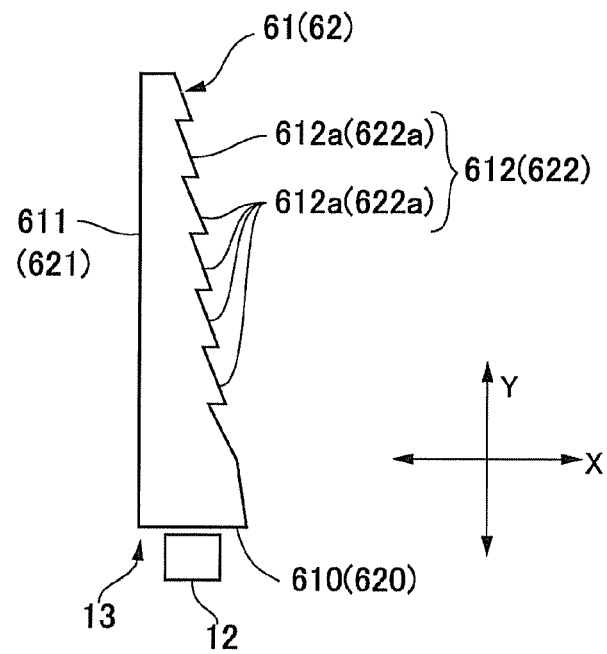
FIG. 8 is an explanatory diagram of a linear light source unit used in an optical position detecting apparatus according to a second modification of the first embodiment of the invention.

FIG. 8 is an explanatory diagram of a linear light source member used in the optical position detecting apparatus 10 according to a second modification of the first embodiment of the invention. Since a basic configuration of this modification is the same as that of the first embodiment, the same components are denoted by the same reference numerals and signs and explanation of the components is omitted.

As explained with reference to FIGS. 2A and 2B, in the first embodiment, in the first light guide members 61 and the second light guide members 62, the inclined reflection surfaces 622 are formed as a continuous plane. However, in this modification, as shown in FIG. 8, the inclined reflection surfaces 612 and 622 are divided as plural reflection surfaces 612a and 622a in an extending direction thereof and formed in a saw-tooth shape. If such a configuration is adopted, there is an advantage that a dimension in the X axis direction of the light incident sections 610 and 620 in the first light guide members 61 and the second light guide members 62 can be reduced.

Second Embodiment

Configuration of the Optical Position Detecting Apparatus 10

Figure 9:
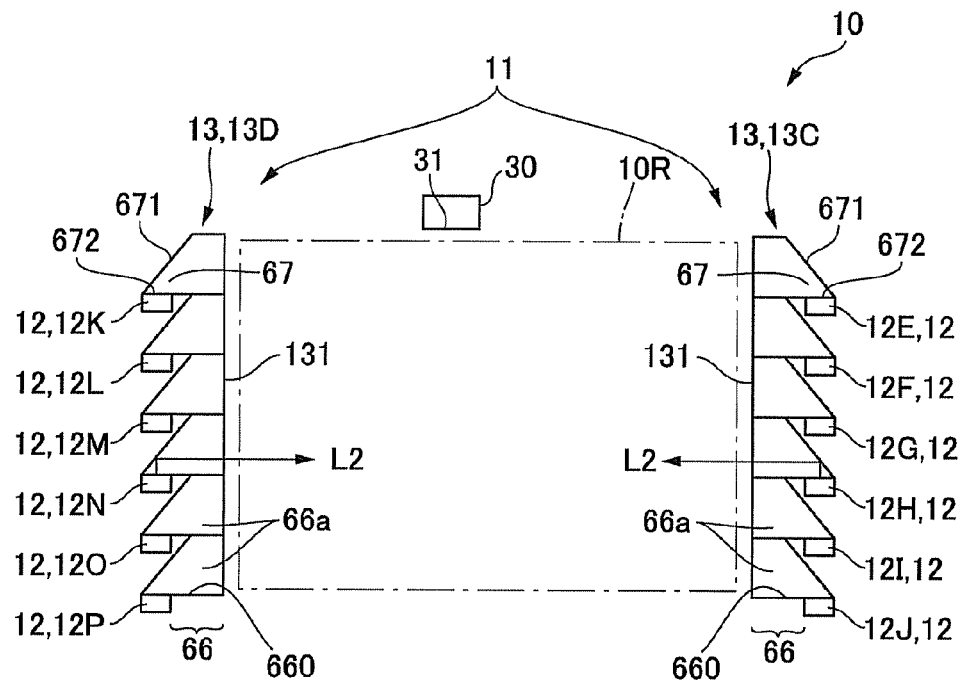
FIG. 9 is an explanatory diagram schematically showing the configuration of an optical position detecting apparatus according to a second embodiment of the invention.
Figure 10:
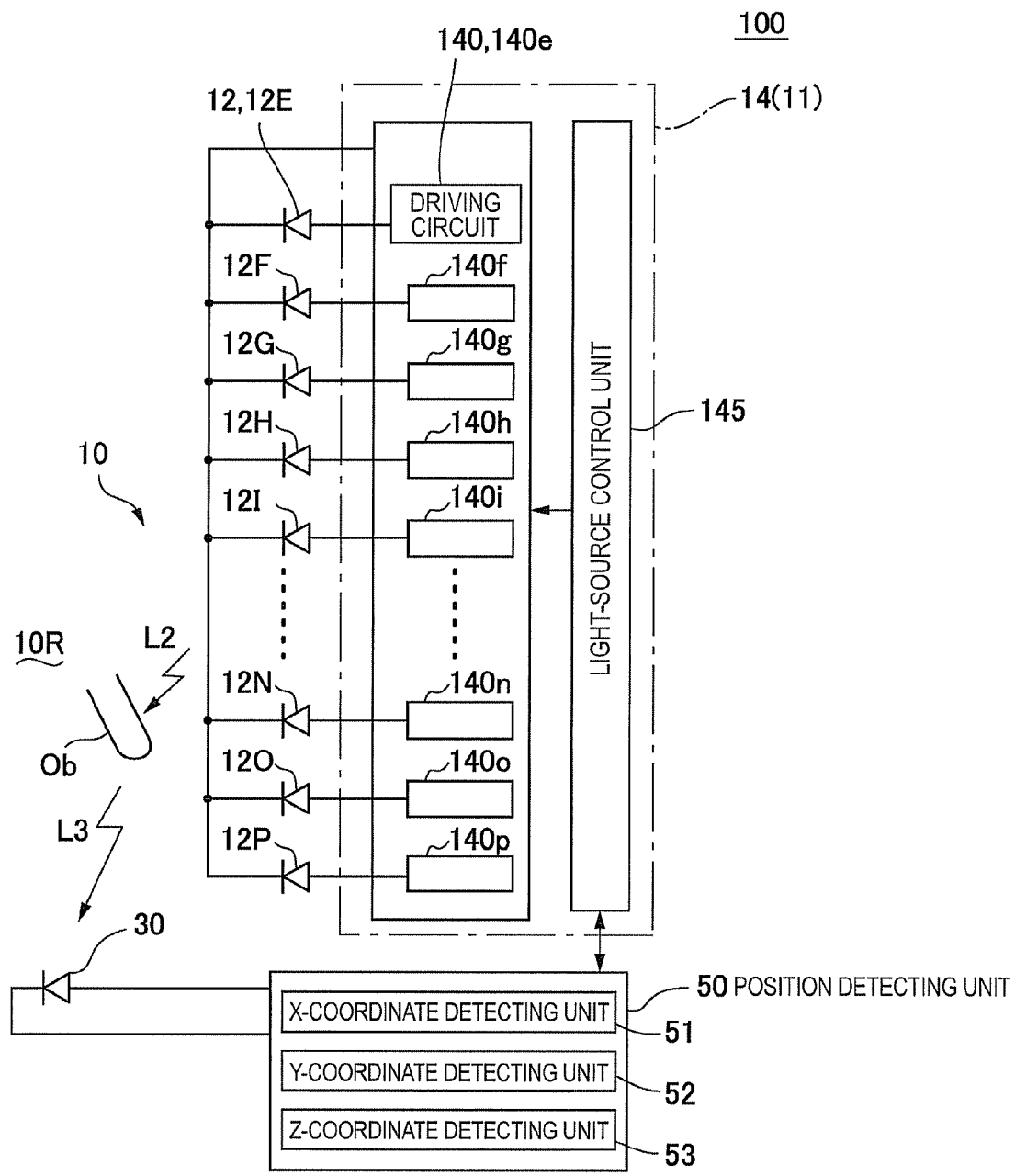
FIG. 10 is an explanatory diagram showing an electric configuration and the like of the optical position detecting apparatus according to the second embodiment of the invention.

FIG. 9 is an explanatory diagram schematically showing the configuration of the optical position detecting apparatus 10 according to a second embodiment of the invention. FIG. 10 is an explanatory diagram showing an electric configuration and the like of the optical position detecting apparatus 10 according to the second embodiment of the invention.

As in the first embodiment, the optical position detecting apparatus 10 shown in FIG. 9 includes the light source device for position detection 11 provided on the screen surface 8a side of the screen member 8 shown in FIGS. 1A and 1B and the photodetector 30 including the light receiving unit 31 faced to the detection region 10R on the screen surface 8a side. The light source device for position detection 11 emits, as the position detection light L2, infrared light having peak wavelength in a wavelength region near 850 nm. The photodetector 30 includes a light receiving element such as a photodiode or a phototransistor. In the optical position detecting apparatus 10 configured in this way, when the position detection light L2 is emitted from the light source device for position detection 11 to the detection region 10R, the position detection light L2 forms an intensity distribution in the detection region 10R. The photodetector 30 detects the position detection light L3 reflected on the target object Ob.

The optical position detecting apparatus 10 according to this embodiment includes, as in the first embodiment, on the outer side of the square detection region 10R, the linear light source units 13 extending along the outer peripheral edges of the detection region 10R and the light-source driving unit 14 explained later with reference to FIG. 10. The linear light source units 13 include the light emitting sections 131 extending along the outer peripheral edges of the detection region 10R. The linear light source units 13 emit the position detection light L2 from such light emitting sections 131 to the detection region 10R. In this embodiment, the linear light source units 13 are arranged as a first linear light source unit 13C and a second linear light source unit 13D in two places on both sides across the detection region 10R in the X axis direction. The two linear light source units 13 (the first linear light source unit 13C and the second linear light source unit 13D) have the same configuration.

Specifically, the first linear light source unit 13C includes a light guide member 66 extending in the Y axis direction along the outer peripheral edge located on one side X1 of the X axis direction in the detection region 10R and plural light emitting elements 12 (light emitting elements 12E to 12J). Such a light guide member 66 is formed of transparent resin such as polycarbonate or acrylic resin. The light emitting elements 12 (the light emitting elements 12E to 12J) include light emitting diodes that emit infrared light as diverging light.

The light guide member 66 includes the light emitting section 131 and prism-like projections 67 provided in plural places in an extending direction of the first linear light source unit 13C on a surface side opposed to the light emitting section 131. The prism-like projections 67 include first sides forming inclined reflection surfaces 671 oblique to the light emitting section 131 and second sides forming light incident sections 672 oblique to the inclined reflection surfaces 671. The light emitting elements 12 (the light emitting elements 12E to 12J) are provided to be respectively faced to the light incident sections 672 of the plural prism-like projections 67. In this embodiment, the inclined reflection surfaces 671 are arranged at an angle of about 30° with respect to the light emitting section 131. The light incident sections 672 are arranged at an angle of about 90° with respect to the light emitting section 131 and at an angle of about 60° with respect to the inclined reflection surfaces 671.

The second linear light source unit 13D includes, like the first linear light source unit 13C, the light guide member 66 extending in the Y axis direction along the outer peripheral edge located on the other side X2 of the X axis direction in the detection region 10R and the plural light emitting elements 12 (light emitting elements 12K to 12P). Such a light guide member 66 is formed of transparent resin such as polycarbonate or acrylic resin. The light emitting elements 12 (the light emitting elements 12K to 12P) include light emitting diodes that emit infrared light.

The light guide member 66 includes the light emitting section 131 and the prism-like projections 67 provided in plural places in an extending direction of the second linear light source unit 13D on a surface side opposed to the light emitting section 131. The prism-like projections 67 include first sides forming the inclined reflection surfaces 671 oblique to the light emitting section 131 and second sides forming light incident sections 672 oblique to the inclined reflection surfaces 671. The light emitting elements 12 (the light emitting elements 12K to 12P) are provided to be respectively faced to the light incident sections 672 of the plural prism-like projections 67. In this embodiment, the inclined reflection surfaces 671 are arranged at an angle of about 30° with respect to the light emitting section 131. The light incident sections 672 are arranged at an angle of about 90° with respect to the light emitting section 131 and at an angle of about 60° with respect to the inclined reflection surfaces 671.

In the linear light source units 13 (the first linear light source unit 13C and the second linear light source unit 13D) configured in this way, as in this embodiment, in some case, the light guide members 66 are configured by combining plural members 66a and, in other cases, the entire light guide members 66 are configured by integral resin molded product.

As shown in FIG. 10, the optical position detecting apparatus 10 according to this embodiment includes the light-source driving unit 14 that drives each of the plural light emitting elements 12 (the light emitting elements 12E to 12P) and the position detecting device 50 that detects the position of the target object Ob on the basis of a detection result in the photodetector 30. The light-source driving unit 14 includes the driving circuits 140 (driving circuits 140e to 140p) respectively corresponding to the plural light emitting elements 12 and the light-source control unit 145 that controls turn-on of each of the plural light emitting elements 12 via the driving circuit 140. The position detecting device 50 includes the X-coordinate detecting unit 51 that detects a position in the X axis direction (an X coordinate) of the target object Ob and the Y-coordinate detecting unit 52 that detects a position in the Y axis direction (a Y coordinate) of the target object Ob. The X axis direction and the Y axis direction cross at a right angle in a plane parallel to the screen member 8. Further, the position detecting device 50 includes the Z-coordinate detecting unit 53 that detects the position of the target object Ob in the Z axis direction orthogonal to the screen 85 (a Z coordinate). The light-source control unit 145 and the position detecting device 50 are connected by a signal line. Driving for the light emitting elements 12 and detection operation in the position detecting device 50 are performed in association with each other.

X Coordinate Detecting Operation

Operation for detecting the position of the target object Ob in the detection region 10R in the optical position detecting apparatus 10 according to this embodiment is explained below. In the optical position detecting apparatus 10 according to this embodiment, the light source device for position detection 11 forms an intensity distribution same as that in the first embodiment. Therefore, when the detection operation is explained, FIGS. 6A to 6D are referred to as in the first embodiment.

In the optical position detecting apparatus 10 according to this embodiment, to detect an X coordinate of the target object Ob in the detection region 10R, first, in a first period for X coordinate detection, the light-source control unit 145 of the light-source driving unit 14 shown in FIG. 10 controls the light emitting elements 12 via the driving circuit 140 to set a balance of light emission amounts of the light emitting elements 12 shown in FIG. 9 to the following conditions:

the first linear light source unit 13A
12E=12F=12G=12H=12I=12J
the second linear light source unit 13B
12K, 12L, 12M, 12N, 12O, 12P=turn off.

As a result, as shown in FIG. 6A, the first intensity distribution for X coordinate detection L2Xa (an intensity distribution for first coordinate detection/a first intensity distribution for first coordinate detection) in which the intensity of the position detection light L2 monotonously decreases from one side X1 to the other side X2 of the X axis direction is formed. In the first intensity distribution for X coordinate detection L2Xa according to this embodiment, the intensity of the position detection light L2 continuously decreases substantially linearly from one side X1 to the other side X2 of the X axis direction. In such a first intensity distribution for X coordinate detection L2Xa, a position in the X axis direction and the intensity of the position detection light L2 have a fixed relation. In the first intensity distribution for X coordinate detection L2Xa, the intensity of the position detection light L2 is fixed in the Y axis direction. Therefore, an amount of light reflected on the target object Ob and detected by the photodetector 30 is a value that is proportional to the intensity of the position detection light L2 in the first intensity distribution for X coordinate detection L2Xa and specified by a position in the X axis direction of the target object Ob.

Subsequently, in the second period for X coordinate detection, the light-source control unit 145 of the light-source driving unit 14 shown in FIG. 10 controls the light emitting elements 12 via the driving circuit 140 to set a balance of light emission amounts of the light emitting elements 12 shown in FIG. 9 to the following conditions:

the first linear light source unit 13A
12E, 12F, 12G, 12H, 12I, 12J=turn off
the second linear light source unit 13B
12K=12L=12M=12N=12O=12P.

As a result, as shown in FIG. 6B, the second intensity distribution for X coordinate detection L2Xb (an intensity distribution for first coordinate detection/a second intensity distribution for first coordinate detection) in which the intensity of the position detection light L2 monotonously decreases from the other side X2 to one side X1 of the X axis direction is formed. In the second intensity distribution for X coordinate detection L2Xb according to this embodiment, the intensity of the position detection light L2 continuously decreases substantially linearly from the other side X2 to one side X1 of the X axis direction. In such a second intensity distribution for X coordinate detection L2Xb, a position in the X axis direction and the intensity of the position detection light L2 have a fixed relation. In the second intensity distribution for X coordinate detection L2Xb, the intensity of the position detection light L2 is fixed in the Y axis direction. Therefore, an amount of light reflected on the target object Ob and detected by the photodetector 30 is a value that is proportional to the intensity of the position detection light L2 in the second intensity distribution for X coordinate detection L2Xb and specified by a position in the X axis direction of the target object Ob.

Therefore, a difference or a ratio between a light amount detected by the photodetector 30 in the first period for X coordinate detection and a light amount detected by the photodetector 30 in the second period for X coordinate detection is a value specified by the position of the target object Ob. Accordingly, the X-coordinate detecting unit 51 of the position detecting device 50 can detect an X coordinate of the target object Ob on the basis of a detection result in the photodetector 30 in the first period for X coordinate detection and a detection result in the photodetector 30 in the second period for X coordinate detection.

Y Coordinate Detecting Operation

To detect a Y coordinate of the target object Ob in the detection region 10R, first, in a first period for Y coordinate detection, the light-source control unit 145 of the light-source driving unit 14 shown in FIG. 10 controls the light emitting elements 12 via the driving circuit 140 to set a balance of light emission amounts of the light emitting elements 12 shown in FIG. 9 to the following conditions:

the first linear light source unit 13A
12E>12F>12G>12H>12I>12J
the second linear light source unit 13B
12K>12L>12M>12N>12O>12P.

As a result, as shown in FIG. 6C, the first intensity distribution for Y coordinate detection L2Ya (an intensity distribution for second coordinate detection/a first intensity distribution for second coordinate detection) in which the intensity of the position detection light L2 monotonously decreases from one side Y1 to the other side Y2 of the Y axis direction is formed. In the first intensity distribution for Y coordinate detection L2Ya according to this embodiment, the intensity of the position detection light L2 continuously decreases substantially linearly from one side Y1 to the other side Y2 of the Y axis direction. In such a first intensity distribution for Y coordinate detection L2Ya, a position in the Y axis direction and the intensity of the position detection light L2 have a fixed relation. In the first intensity distribution for Y coordinate detection L2Ya, the intensity of the position detection light L2 is fixed in the X axis direction. Therefore, an amount of light reflected on the target object Ob and detected by the photodetector 30 is a value that is proportional to the intensity of the position detection light L2 in the first intensity distribution for Y coordinate detection L2Ya and specified by a position in the Y axis direction of the target object Ob.

Subsequently, in the second period for Y coordinate detection, the light-source control unit 145 of the light-source driving unit 14 shown in FIG. 10 controls the light emitting elements 12 via the driving circuit 140 to set a balance of light emission amounts of the light emitting elements 12 shown in FIG. 9 to the following conditions:

the first linear light source unit 13A
12E<12F<12G<12H<12I<12J
the second linear light source unit 13B
12K<12L<12M<12N<12O<12P.

As a result, as shown in FIG. 6D, the second intensity distribution for Y coordinate detection L2Yb (an intensity distribution for second coordinate detection/a second intensity distribution for second coordinate detection) in which the intensity of the position detection light L2 monotonously decreases from the other side Y2 to one side Y1 of the Y axis direction is formed. In the second intensity distribution for Y coordinate detection L2Yb according to this embodiment, the intensity of the position detection light L2 continuously decreases substantially linearly from the other side Y2 to one side Y1 of the Y axis direction. In such a second intensity distribution for Y coordinate detection L2Yb, a position in the Y axis direction and the intensity of the position detection light L2 have a fixed relation. In the second intensity distribution for Y coordinate detection L2Yb, the intensity of the position detection light L2 is fixed in the X axis direction. Therefore, an amount of light reflected on the target object Ob and detected by the photodetector 30 is a value that is proportional to the intensity of the position detection light L2 in the second intensity distribution for Y coordinate detection L2Yb and specified by a position in the Y axis direction of the target object Ob.

Therefore, a difference or a ratio between a light amount detected by the photodetector 30 in the first period for Y coordinate detection and a light amount detected by the photodetector 30 in the second period for Y coordinate detection is a value specified by the position of the target object Ob. Accordingly, the Y-coordinate detecting unit 52 of the position detecting device 50 can detect a Y coordinate of the target object Ob on the basis of a detection result in the photodetector 30 in the first period for Y coordinate detection and a detection result in the photodetector 30 in the second period for Y coordinate detection.

Z Coordinate Detecting Operation

In the display device with position detecting function 100 according to this embodiment, to detect a Z coordinate of the target object Ob in the detection region 10R, all the light emitting elements 12 (the light emitting elements 12E to 12P) shown in FIG. 9 are turned on with the same light emission amount. As a result, an intensity distribution for Z coordinate detection in which the intensity of the position detection light L2 monotonously decreases in a direction away from the screen member 8 in the Z axis direction is formed. In such an intensity distribution for Z coordinate detection, a position in the Z axis direction and the intensity of the position detection light L2 have a fixed relation. Therefore, an amount of light reflected on the target object Ob and detected by the photodetector 30 is a value that is proportional to the intensity of the position detection light L2 in the intensity distribution for Z coordinate detection and specified by a position in the Z axis direction of the target object Ob. Therefore, the Z-coordinate detecting unit 53 of the position detecting device 50 can detect a Z coordinate of the target object Ob on the basis of a detection result of the photodetector 30 in the Z coordinate detection period.

Main Effects of this Embodiment

As explained above, in the display device with position detecting function 100 according to this embodiment, as in the first embodiment, when the light emitting elements 12 emit the position detection light L2, an intensity distribution of the position detection light L2 is formed on the screen surface 8a side. Therefore, when the position detection light L2 is reflected by the target object Ob located in the detection region 10R set on the screen surface 8a side, such light is detected by the photodetector 30. Therefore, if a relation between a position in the detection region 10R and the intensity of the position detection light L2 is grasped in advance, it is possible to detect the position of the target object Ob on the basis of a light reception result of the photodetector 30. Since the position detection light L2 includes infrared light, there is an advantage that the position detection light L2 does not prevent display of an image.

In this embodiment, the plural light emitting elements 12 are used. However, only one photodetector 30 has to be provided. Moreover, since an intensity distribution formed in the detection region 10R is utilized, the number of light emitting elements 12 may be small. Therefore, it is possible to configure the optical position detecting apparatus 10 that is manufactured at low cost and consumes low power.

In this embodiment, the linear light source units 13 are used and, in such linear light source units 13, it is easy to control emission intensity of the position detection light L2 in the extending direction of the linear light source units 13. The intensity of the position detection light L2 in the emitting direction from the linear light source units 13 is surely specified by a distance from the linear light source unit 13. Therefore, it is possible to surely form a proper intensity distribution of the position detection light L2 in the detection region 10R. Accordingly, it is possible to detect the position of the target object Ob at high accuracy.

Further, the linear light source units 13 include the light emitting elements 12 that emit the position detection light L2 and the light guide members 66 extending along the outer peripheral edges of the detection region 10R. Therefore, since the light emitting elements 12 can be used as light sources, the linear light source units 13 are inexpensive. There is an advantage that the emission intensity of the position detection light L2 in the extending direction of the linear light source units 13 can be surely controlled by the light guide members 66 and the light emitting elements 12. Moreover, the linear light source units 13 include the plural light emitting elements 12 on both the sides of the detection region 10R. Therefore, as explained with reference to FIGS. 6A to 6D, it is possible to form, at different timings, a first intensity distribution for X coordinate detection, a second intensity distribution for X coordinate detection, a first intensity distribution for Y coordinate detection, and a second intensity distribution for Y coordinate detection. Therefore, it is possible to detect two-dimensional coordinates of the target object Ob at high accuracy.

Another Embodiment

Figure 11:
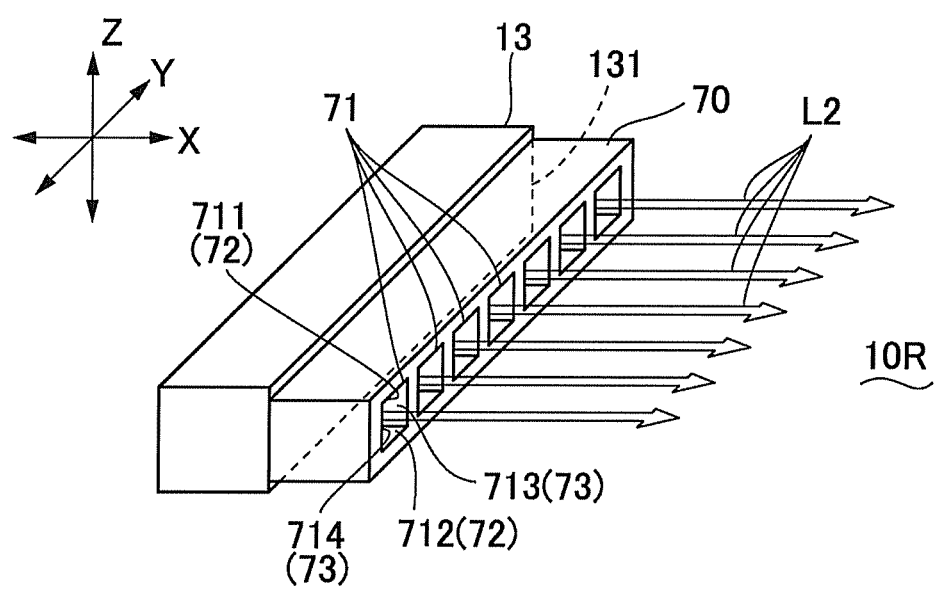
FIG. 11 is an explanatory diagram of an emitting-direction limiting member used in an optical position detecting apparatus according to another embodiment of the invention.

FIG. 11 is an explanatory diagram of an emitting-direction limiting member used in the optical position detecting apparatus 10 according to another embodiment of the invention. In the first and second embodiments, the position detection light L2 is directly emitted from the linear light source unit 13 to the detection region 10R. However, in this embodiment, an emitting-direction limiting member 70 is provided in front of the linear light source unit 13. In such an emitting-direction limiting member 70, plural square holes 71 are formed along the extending direction of the linear light source unit 13. Such square holes 71 pierce through the emitting-direction limiting member 70 in an emitting direction of the position detection light L2 from the linear light source unit 13. Therefore, the position detection light L2 is emitted to the detection region 10R through the square holes 71.

In the emitting-direction limiting member 70 configured in this way, upper and lower wall surfaces 711 and 712 of the square holes 71 are formed as first light blocking sections 72 that limit emission of the position detection light L2 in a direction (the Z axis direction) orthogonal to both of a direction to which the light emitting section 131 of the linear light source unit 13 faces (the X axis direction) and the extending direction of the linear light source unit 13 (the Y axis direction). Left and right wall surfaces 713 and 714 of the square holes 71 are formed as second light blocking sections 73 that limit emission of the position detection light L2 in a direction obliquely tilting from the direction to which the light emitting section 131 faces (the X axis direction) to the extending direction of the linear light source unit 13 (the Y axis direction).

Therefore, it is possible to narrow a divergence angle of the position detection light L2 emitted from the light emitting section 131 to the detection region 10R and emit the position detection light L2 from the light emitting section 131 to the detection region 10R as substantially parallel rays. Therefore, since it is possible to properly form an intensity distribution of the position detection light L2 in the detection region 10R, it is possible to accurately detect the position of the target object Ob. Further, since the first light blocking sections 72 and the second light blocking sections 73 are formed in the common emitting-direction limiting member 70, there is an advantage that it is possible to properly form an intensity distribution of the position detection light L2 in the detection region 10R simply by arranging the emitting-direction limiting member 70 on the front side of the linear light source unit 13.

Only one of the first light blocking sections 72 and the second light blocking sections 73 may be provided in the emitting-direction limiting member 70. Even in this case, it is possible to narrow a divergence angle of the position detection light L2 on a side on which the light blocking sections are provided.

Figure 12A:
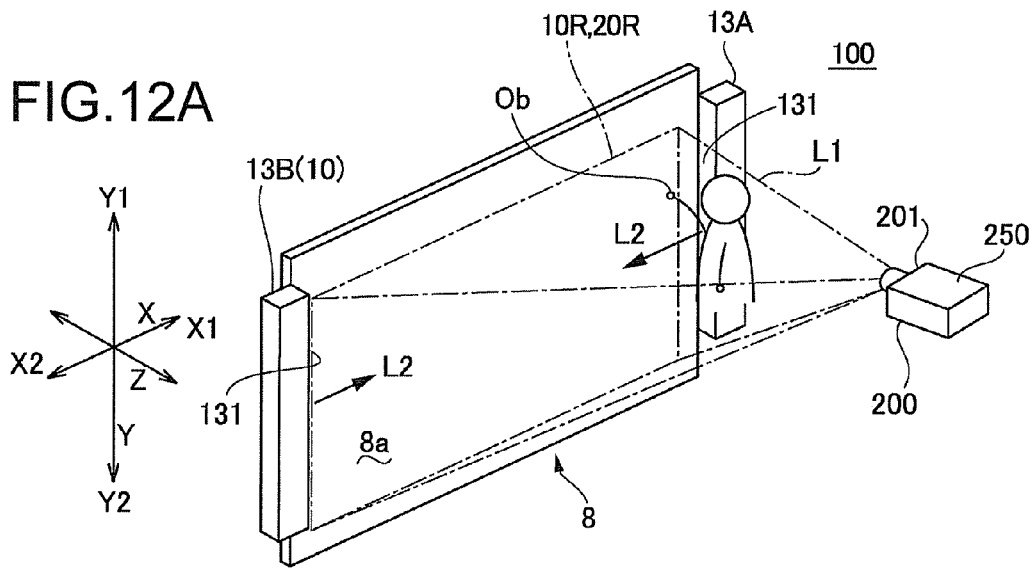
FIGS. 12A and 12B are explanatory diagrams schematically showing the configuration of a display device with position detecting function of another projection type according to a modification of the embodiments of the invention.
Figure 12B:
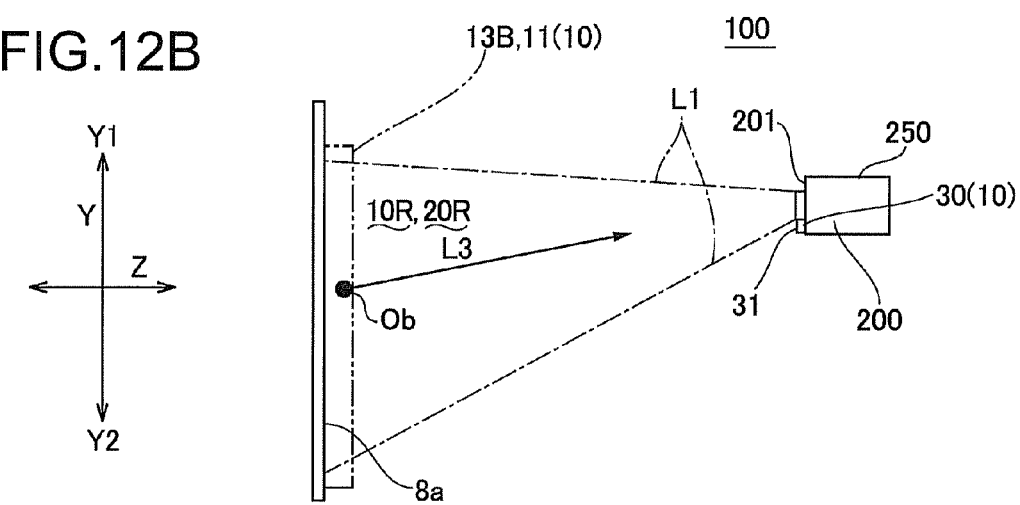

Display Device with Position Detection Function of Projection Type According to Modification FIGS. 12A and 12B are explanatory diagrams schematically showing the configuration of the display device with position detecting function 100 of another projection type according to a modification of the embodiments of the invention. FIG. 12A is an explanatory diagram schematically showing a state in which a main part of the display device with position detecting function 100 is viewed from obliquely above. FIG. 12B is an explanatory diagram schematically showing a state in which the main part of the display device with position detecting function 100 is viewed from a lateral direction. Since a basic configuration of this modification is the same as that of the embodiments, the same components are denoted by the same reference numerals and signs and explanation of the components is omitted.

In the embodiments, on the side of the screen surface 8a of the screen member 8, the photodetector 30 faces the light receiving unit 31 to the direction along the screen surface 8a on the outer side of the detection region 10R. However, as shown in FIGS. 12A and 12B, in this modification, the photodetector 30 faces the light receiving unit 31 to the screen surface 8a from an out-of-plane direction of the screen surface 8a. More specifically, the photodetector 30 is provided on the front section 201 of the housing 250 of the image projecting device 200. Therefore, the photodetector 30 detects, in the position detection light L2, the position detection light L3 reflected to the image projecting device 200 on the target object Ob.

Therefore, in the display device with position detecting function 100 according to this embodiment, it is possible to expand a distance away from the screen surface 8a in which the target object Ob can be detected. It is unnecessary to set the photodetector 30 separately from the image projecting device 200. It is possible to perform processing for detecting the position of the target object Ob on the side of the image projecting device 200. Further, it is easy to reflect a position detection result of the target object Ob on an image projected from the image projecting device 200.

Other Embodiments

In the embodiments explained above, the linear light source units 13 are provided on both the sides in the X axis direction of the detection region 10R. However, the linear light source units 13 may be provided on both sides in the Y axis direction of the detection region 10R.

In the embodiments, the linear light source units 13 are provided on both the sides across the detection region 10R. However, the linear light source units 13 may be arranged in four sides surrounding the detection region 10R.

In the embodiments, the linear light source units 13 include the light emitting elements 12 and the light guide plates. However, infrared lamps extending in a bar shape may be used as the linear light source units 13.

The optical position detecting apparatus 10 and the display device with position detecting function 100 of an aspect of the invention are not limited to the embodiments explained above. It goes without saying that various changes can be made to the embodiments without departing from the spirit of the invention.

Display Device with Position Detecting Function 100 According to Modification In the embodiments, the display device with position detecting function includes the image projecting device 200 as the image generating device. However, if a direct-view display device is adopted as the image generating device as shown in FIG. 13, the display device with position detecting function can be used in electronic apparatuses explained later with reference to FIGS. 14A to 14C.

Figure 13:
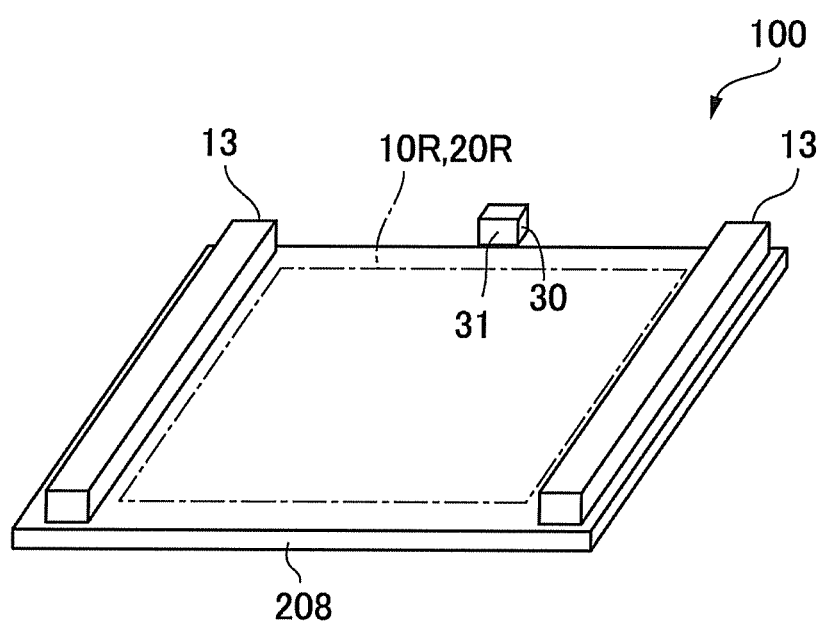
FIG. 13 is an explanatory diagram of a display device with position detecting function according to a modification of the embodiments of the invention.

FIG. 13 is an explanatory diagram of the display device with position detecting function 100 according to a modification of the embodiments of the invention. In the display device with position detecting function 100 according to this modification, the configuration of the optical position detecting apparatus 10 is the same as that in the embodiments. Therefore, the same components are denoted by the same reference numerals and signs and explanation of the components is omitted.

The display device with position detecting function 100 shown in FIG. 13 includes the optical position detecting apparatus 10 and a direct-view display device 208 such as a liquid crystal device, an organic electroluminescence device, or a plasma display device as an image generating device. The optical position detecting apparatus 10 includes the linear light source units 13 explained in the above embodiments and the photodetector 30 that faces the light receiving unit 31 to the detection region 10R. The direct-view display device 208 includes an image display region 20R in a region overlapping the detection region 10R in plan view. Such an image display region 20R overlaps the detection region 10R in plan view.

Examples of Mounting on Electronic Apparatus

Figure 14A:
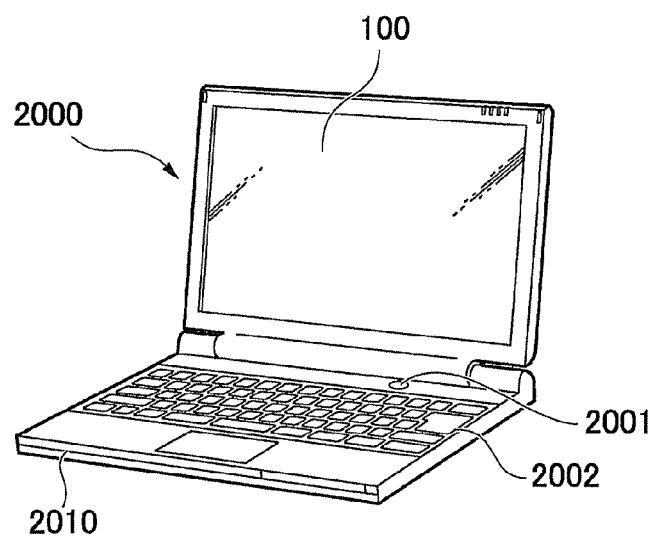
FIGS. 14A to 14C are explanatory diagrams of electronic apparatuses including the display device with position detecting function according to the modification of the embodiments of the invention.
Figure 14B:
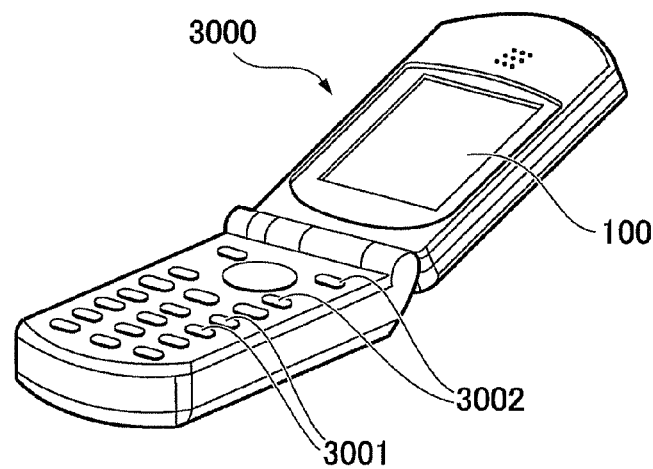
Figure 14C:
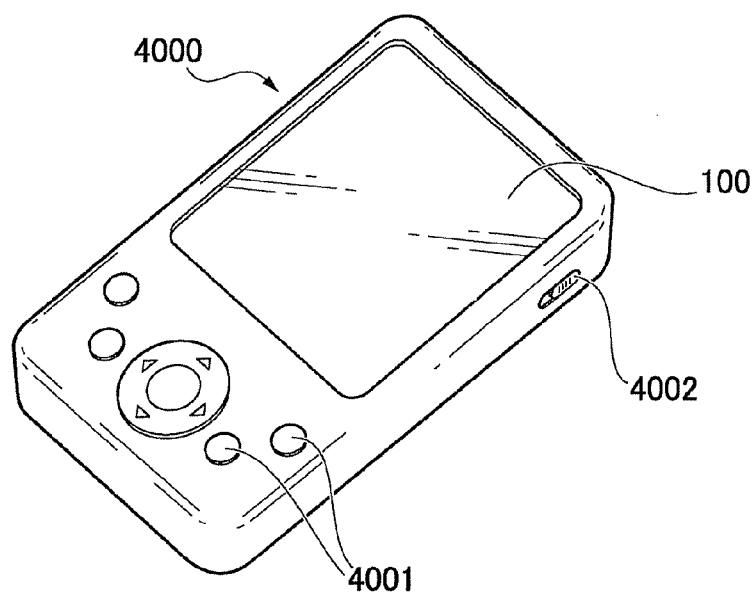
Figure 15:
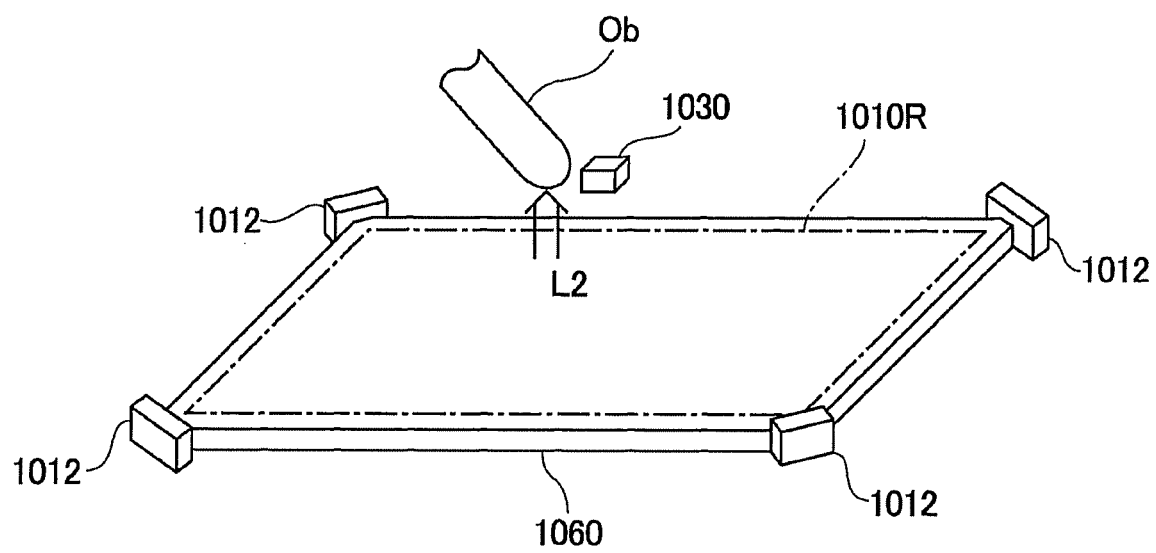
FIG. 15 is an explanatory diagram of an optical position detecting apparatus according to a reference example of the invention.

Electronic apparatuses mounted with the display device with position detecting function 100 explained with reference to FIG. 13 are explained with reference to FIGS. 14A to 14C. FIGS. 14A to 14C are explanatory diagrams of electronic apparatuses including the display device with position detecting function according to the modification explained above. In FIG. 14A, the configuration of a mobile personal computer including the display device with position detecting function 100 is shown. A personal computer 2000 includes the display device with position detecting function 100 as a display unit and a main body unit 2010. In the main body unit 2010, a power switch 2001 and a keyboard 2002 are provided. In FIG. 14B, the configuration of a cellular phone including the display device with position detecting function 100 is shown. A cellular phone 3000 includes plural operation buttons 3001, scroll buttons 3002, and the display device with position detecting function 100 as a display unit. A user operates the scroll buttons 3002 to thereby scroll a screen displayed on the display device with position detecting function 100. In FIG. 14C, the configuration of a personal digital assistant (PDA) mounted with the display device with position detecting function 100 is shown. A personal digital assistant 4000 includes plural operation buttons 4001, a power switch 4002, and the display device with position detecting function 100 as a display unit. When a user operates the power switch 4002, various kinds of information such as an address book and a schedule book are displayed on the display device with position detecting function 100.

Examples of the electronic apparatuses mounted with the display device with position detecting function 100 include, besides the electronic apparatuses shown in FIGS. 14A to 14C, electronic apparatuses such as a digital still camera, a liquid crystal television, video tape recorders of a view-finder type and a monitor direct-view type, a car navigation system, a pager, an electronic notebook, an electric calculator, a word processor, a work station, a video telephone, a POS terminal, and a bank terminal. As display units of these electronic apparatuses, the display device with position detecting function 100 can be applied.

The disclosure of Japanese Patent Application No. 2009-245192, filed Oct. 26, 2009 is expressly incorporated by reference herein.

What is claimed is:

1. An optical position detecting apparatus that optically detects a position of a target object in a detection region, the optical position detecting apparatus comprising:
    a light source device that emits position detection light to the detection region and forms an intensity distribution of the position detection light in the detection region;
    a photodetector that receives the position detection light reflected on the target object; and
    a position detecting device that detects the position of the target object on the basis of a light reception result in the photodetector,
    wherein the light source device includes:
        a linear light source unit extending along an outer peripheral edge of the detection region and including a light emitting section that emits the position detection light to the detection region; and
        a light-source driving unit that drives the linear light source unit; and
    wherein the linear light source unit includes:
        a first light guide member extending along the outer peripheral edge of the detection region;
        a first light emitting element that emits the position detection light to a light incident section provided at one end in an extending direction of the first light guide member;
        a second light guide member extending along the outer peripheral edge of the detection region; and
        a second light emitting element that emits the position detection light to a light incident section provided at one end in an extending direction of the second light guide member, and
    each of the first light guide member and the second light guide member includes:
        the light emitting section; and an inclined reflection surface formed obliquely to the light emitting section on a surface side opposed to the light emitting section, and the first light guide member and the second light guide member are arranged to face to directions opposite to each other in an extending direction of the linear light source unit and in parallel in a direction orthogonal to the extending direction.

2. The optical position detecting apparatus according to claim 1, wherein the linear light source unit is provided as a first linear light source unit and a second linear light source unit extending along an outer peripheral edge of the detection region on both sides across the detection region, and the first linear light source unit and the second linear light source unit are switched by the light-source driving unit to a first mode in which an emitted light amount decreases from one side to the other side of the extending direction of the linear light source unit, a second mode in which an emitted light amount decreases from the other side to one side of the extending direction of the linear light source unit, and a third mode in which an emitted light amount is equal from one side to the other side of the extending direction of the linear light source unit.

3. The optical position detecting apparatus according to claim 1, wherein, in front of the light emitting section, at least one of a first light blocking section and a second light blocking section is provided, the first light blocking section limiting emission of the position detection light in a direction orthogonal to both a direction to which the light emitting section faces and an extending direction of the linear light source unit, and the second light blocking section limiting emission of the position detection light in a direction obliquely tilting to the extending direction from a direction to which the light emitting section faces in plural places in the extending direction.

4. The optical position detecting apparatus according to claim 3, wherein the first light blocking section and the second light blocking section are formed in a common emitting-direction limiting member.

5. The optical position detecting apparatus according to claim 1, wherein the position detection light includes infrared light.

6. A display device with position detecting function including the optical position detecting apparatus according to claim 1, the display device with position detecting function comprising an image generating device that forms an image in a region overlapping the detection region.

7. An optical position detecting apparatus that optically detects a position of a target object in a detection region, the optical position detecting apparatus comprising:

a light source device that emits position detection light to the detection region and forms an intensity distribution of the position detection light in the detection region;

a photodetector that receives the position detection light reflected on the target object; and a position detecting device that detects the position of the target object on the basis of a light reception result in the photodetector, wherein the light source device includes:
a linear light source unit extending along an outer peripheral edge of the detection region and including a light emitting section that emits the position detection light to the detection region; and
a light-source driving unit that drives the linear light source unit; and wherein the linear light source unit includes:
a light guide member extending along an outer peripheral edge of the detection region; and
plural light emitting elements that emit the position detection light to the light guide member, the light guide member includes:
the light emitting section; and
prism-like projections provided in plural places in an extending direction of the linear light source unit on a surface side opposed to the light emitting section, the prism-like projections include:
first sides that form inclined reflection surfaces oblique to the light emitting section; and
second sides that form light incident sections oblique to the inclined reflection surfaces, and the light emitting elements are provided toward the light incident sections of the prism-like projections.

* * * * *